US012579583B2

(12) United States Patent
Schmelkin et al.

(10) Patent No.: US 12,579,583 B2
(45) Date of Patent: Mar. 17, 2026

(54) ANALYZING SUBMISSION FOR RISK ASSESSMENT BASED ON RULE SET

(71) Applicant: Sixfold AI, Inc., New York, NY (US)

(72) Inventors: Alexander M. Schmelkin, New York, NY (US); Brian Moseley, New York, NY (US); Jane Tran, New York, NY (US); Gregory Hess Tourville, New York, NY (US); Omeed Fallahi, New York, NY (US); Ian Namit Hirschfeld, New York, NY (US); Dhrubajyoti Das, New York, NY (US); Stewart Hu, New York, NY (US); Samuel Levine, New York, NY (US)

(73) Assignee: Sixfold AI, Inc., New York, NY (US)

( * ) Notice: Subject to any disclaimer, the term of this patent is extended or adjusted under 35 U.S.C. 154(b) by 0 days.

(21) Appl. No.: 18/622,191

(22) Filed: Mar. 29, 2024

(65) Prior Publication Data

US 2025/0307943 A1    Oct. 2, 2025

(51) Int. Cl.
*G06Q 40/08* (2012.01)

(52) U.S. Cl.
CPC .................................... *G06Q 40/08* (2013.01)

(58) Field of Classification Search
CPC ...................................................... G06Q 40/08
See application file for complete search history.

(56) References Cited

U.S. PATENT DOCUMENTS

| | | | |
|---|---|---|---|
| 10,497,250 B1 * | 12/2019 | Hayward | ............... G06V 20/00 |
| 10,902,524 B2 * | 1/2021 | Trainor | ................... G06N 5/04 |
| 2015/0205863 A1 | 7/2015 | Drennan, III | |
| 2019/0156256 A1 | 5/2019 | Argyros et al. | |
| 2020/0020040 A1 | 1/2020 | Gokhale et al. | |
| 2023/0334578 A1 | 10/2023 | Wang et al. | |

* cited by examiner

*Primary Examiner* — Edward Chang
(74) *Attorney, Agent, or Firm* — Schwegman Lundberg & Woessner, P.A.

(57) ABSTRACT

Aspects of the present disclosure describe a system comprising a computer-readable storage medium storing a program and method for analyzing one or more electronic submissions based on a rule set to generate a risk assessment of an applicant. In particular, some embodiments analyze one or more electronic submissions for an applicant of an insurance policy (or insurance product) based on a rule set (e.g., structured, machine-readable rule set) that describes one or more rules, guidelines, or parameters that codify an insurance carrier's risk appetite. Based on the analysis, various embodiments generate a risk assessment for the applicant, where the risk assessment can include a risk summary, a risk classification, a risk score, a listing of detected risk signals, or some combination thereof for the applicant.

20 Claims, 16 Drawing Sheets

Figure 6:
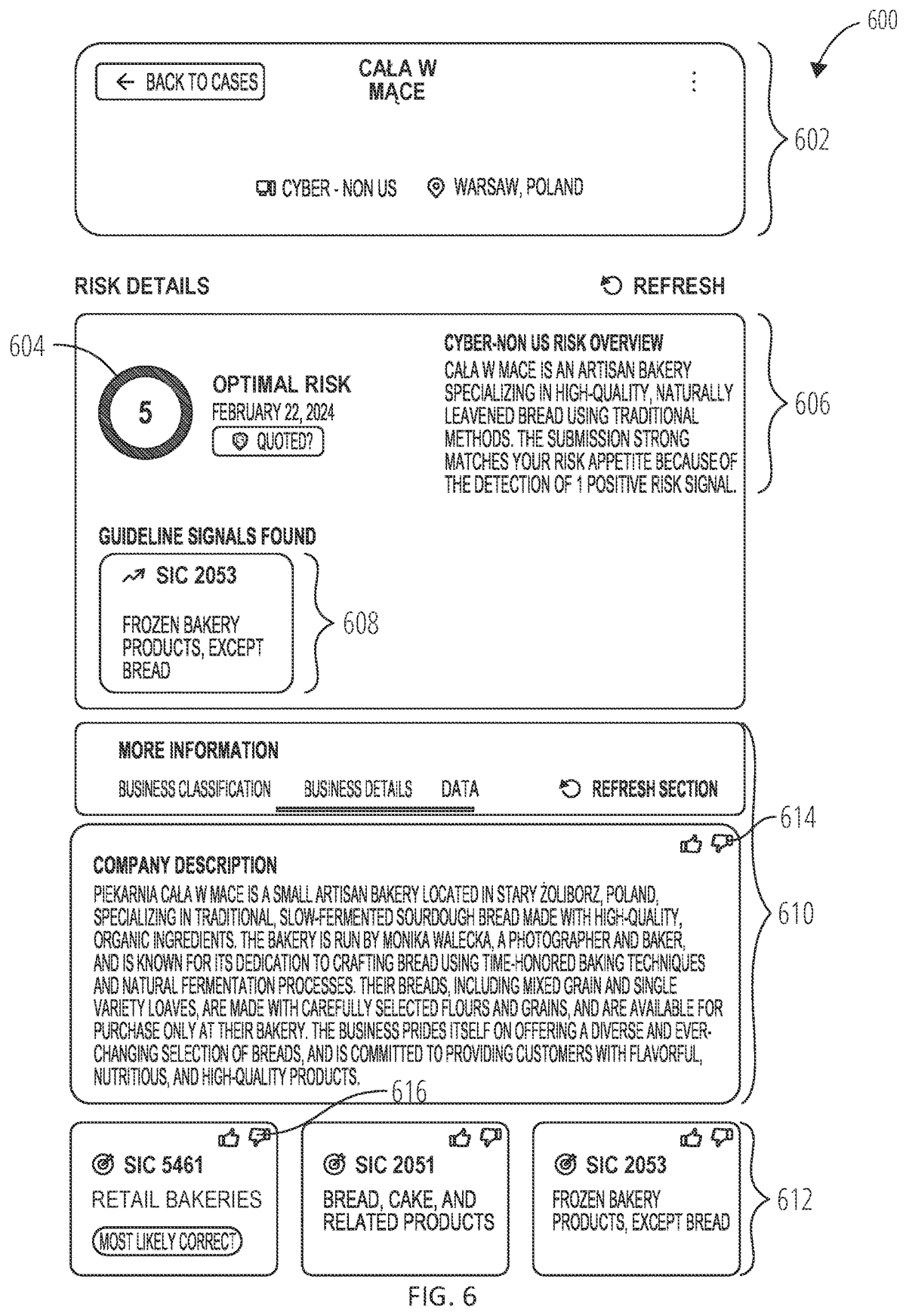

600

602

← BACK TO CASES          CAŁA W MĄCE          ⋮

☒ CYBER - NON US          ◎ WARSAW, POLAND

RISK DETAILS          ↺ REFRESH

604

OPTIMAL RISK
FEBRUARY 22, 2024
⊙ QUOTED?

5

CYBER-NON US RISK OVERVIEW
CAŁA W MĄCE IS AN ARTISAN BAKERY SPECIALIZING IN HIGH-QUALITY, NATURALLY LEAVENED BREAD USING TRADITIONAL METHODS. THE SUBMISSION STRONG MATCHES YOUR RISK APPETITE BECAUSE OF THE DETECTION OF 1 POSITIVE RISK SIGNAL.

606

GUIDELINE SIGNALS FOUND

↗ SIC 2053

FROZEN BAKERY PRODUCTS, EXCEPT BREAD

608

MORE INFORMATION

BUSINESS CLASSIFICATION          BUSINESS DETAILS          DATA          ↺ REFRESH SECTION

614

👍 💬

COMPANY DESCRIPTION
PIEKARNIA CAŁA W MĄCE IS A SMALL ARTISAN BAKERY LOCATED IN STARY ŻOLIBORZ, POLAND, SPECIALIZING IN TRADITIONAL, SLOW-FERMENTED SOURDOUGH BREAD MADE WITH HIGH-QUALITY, ORGANIC INGREDIENTS. THE BAKERY IS RUN BY MONIKA WALECKA, A PHOTOGRAPHER AND BAKER, AND IS KNOWN FOR ITS DEDICATION TO CRAFTING BREAD USING TIME-HONORED BAKING TECHNIQUES AND NATURAL FERMENTATION PROCESSES. THEIR BREADS, INCLUDING MIXED GRAIN AND SINGLE VARIETY LOAVES, ARE MADE WITH CAREFULLY SELECTED FLOURS AND GRAINS, AND ARE AVAILABLE FOR PURCHASE ONLY AT THEIR BAKERY. THE BUSINESS PRIDES ITSELF ON OFFERING A DIVERSE AND EVER-CHANGING SELECTION OF BREADS, AND IS COMMITTED TO PROVIDING CUSTOMERS WITH FLAVORFUL, NUTRITIOUS, AND HIGH-QUALITY PRODUCTS.

610

616

👍 💬
◎ SIC 5461
RETAIL BAKERIES
MOST LIKELY CORRECT

👍 💬
◎ SIC 2051
BREAD, CAKE, AND RELATED PRODUCTS

👍 💬
◎ SIC 2053
FROZEN BAKERY PRODUCTS, EXCEPT BREAD

Figure 10A:
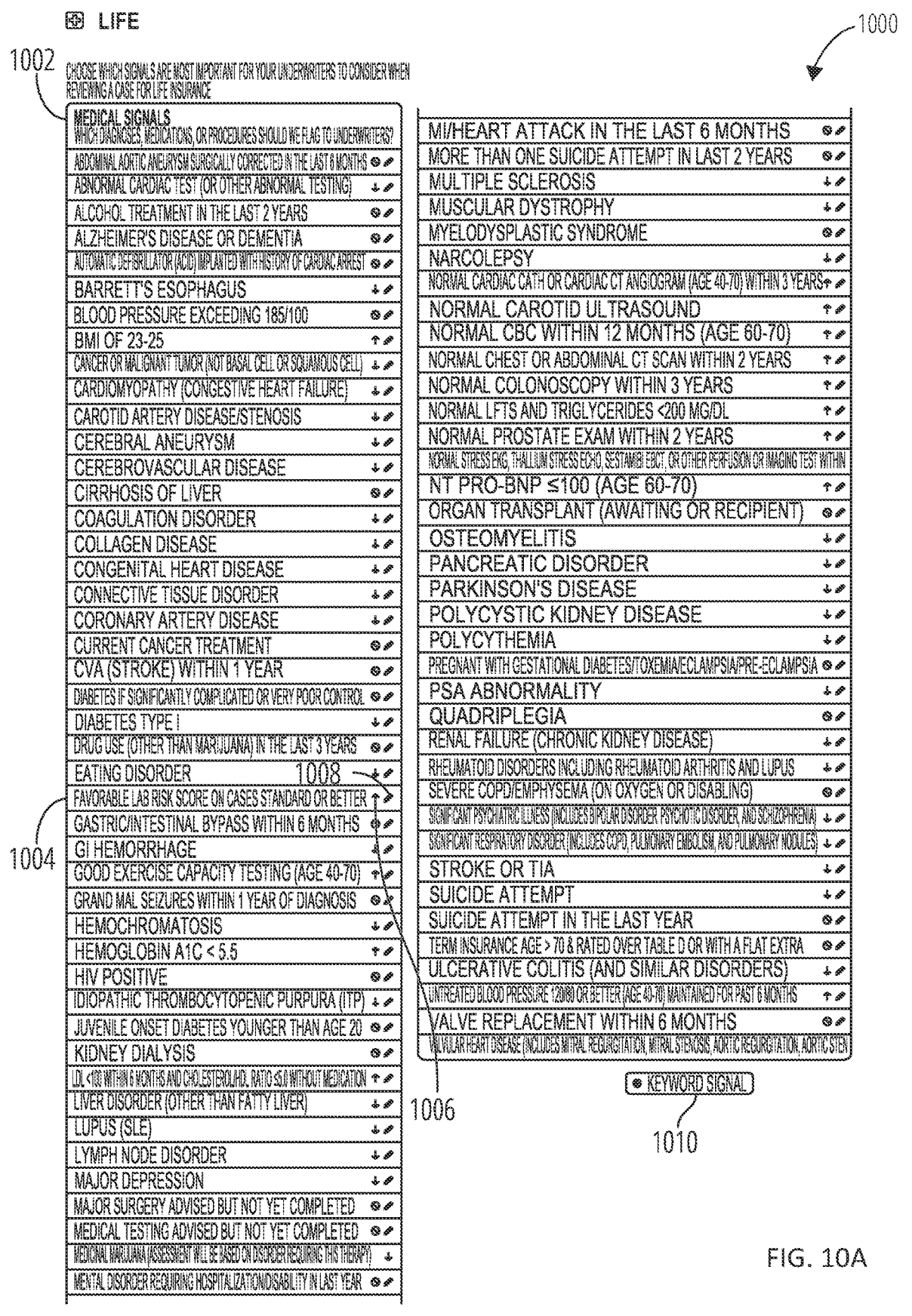

⊞ LIFE

1002

CHOOSE WHICH SIGNALS ARE MOST IMPORTANT FOR YOUR UNDERWRITERS TO CONSIDER WHEN REVIEWING A CASE FOR LIFE INSURANCE

1000

MEDICAL SIGNALS
WHICH DIAGNOSES, MEDICATIONS, OR PROCEDURES SHOULD WE FLAG TO UNDERWRITERS?

| Medical Signals |
|---|
| ABDOMINAL AORTIC ANEURYSM SURGICALLY CORRECTED IN THE LAST 6 MONTHS |
| ABNORMAL CARDIAC TEST (OR OTHER ABNORMAL TESTING) |
| ALCOHOL TREATMENT IN THE LAST 2 YEARS |
| ALZHEIMER'S DISEASE OR DEMENTIA |
| AUTOMATIC DEFIBRILLATOR (AICD) IMPLANTED WITH HISTORY OF CARDIAC ARREST |
| BARRETT'S ESOPHAGUS |
| BLOOD PRESSURE EXCEEDING 185/100 |
| BMI OF 23-25 |
| CANCER OR MALIGNANT TUMOR (NOT BASAL CELL OR SQUAMOUS CELL) |
| CARDIOMYOPATHY (CONGESTIVE HEART FAILURE) |
| CAROTID ARTERY DISEASE/STENOSIS |
| CEREBRAL ANEURYSM |
| CEREBROVASCULAR DISEASE |
| CIRRHOSIS OF LIVER |
| COAGULATION DISORDER |
| COLLAGEN DISEASE |
| CONGENITAL HEART DISEASE |
| CONNECTIVE TISSUE DISORDER |
| CORONARY ARTERY DISEASE |
| CURRENT CANCER TREATMENT |
| CVA (STROKE) WITHIN 1 YEAR |
| DIABETES IF SIGNIFICANTLY COMPLICATED OR VERY POOR CONTROL |
| DIABETES TYPE I |
| DRUG USE (OTHER THAN MARIJUANA) IN THE LAST 3 YEARS |
| EATING DISORDER    1008 |
| FAVORABLE LAB RISK SCORE ON CASES STANDARD OR BETTER |
| GASTRIC/INTESTINAL BYPASS WITHIN 6 MONTHS |
| GI HEMORRHAGE |
| GOOD EXERCISE CAPACITY TESTING (AGE 40-70) |
| GRAND MAL SEIZURES WITHIN 1 YEAR OF DIAGNOSIS |
| HEMOCHROMATOSIS |
| HEMOGLOBIN A1C < 5.5 |
| HIV POSITIVE |
| IDIOPATHIC THROMBOCYTOPENIC PURPURA (ITP) |
| JUVENILE ONSET DIABETES YOUNGER THAN AGE 20 |
| KIDNEY DIALYSIS |
| LDL <100 WITHIN 6 MONTHS AND CHOLESTEROL/HDL RATIO ≤5.0 WITHOUT MEDICATION |
| LIVER DISORDER (OTHER THAN FATTY LIVER) |
| LUPUS (SLE) |
| LYMPH NODE DISORDER |
| MAJOR DEPRESSION |
| MAJOR SURGERY ADVISED BUT NOT YET COMPLETED |
| MEDICAL TESTING ADVISED BUT NOT YET COMPLETED |
| MEDICAL MARIJUANA (ASSESSMENT WILL BE BASED ON DISORDER REQUIRING THIS THERAPY) |
| MENTAL DISORDER REQUIRING HOSPITALIZATION/DISABILITY IN LAST YEAR |

1004

1006

| Medical Signals (cont.) |
|---|
| MI/HEART ATTACK IN THE LAST 6 MONTHS |
| MORE THAN ONE SUICIDE ATTEMPT IN LAST 2 YEARS |
| MULTIPLE SCLEROSIS |
| MUSCULAR DYSTROPHY |
| MYELODYSPLASTIC SYNDROME |
| NARCOLEPSY |
| NORMAL CARDIAC CATH OR CARDIAC CT ANGIOGRAM (AGE 40-70) WITHIN 3 YEARS |
| NORMAL CAROTID ULTRASOUND |
| NORMAL CBC WITHIN 12 MONTHS (AGE 60-70) |
| NORMAL CHEST OR ABDOMINAL CT SCAN WITHIN 2 YEARS |
| NORMAL COLONOSCOPY WITHIN 3 YEARS |
| NORMAL LFTS AND TRIGLYCERIDES <200 MG/DL |
| NORMAL PROSTATE EXAM WITHIN 2 YEARS |
| NORMAL STRESS EKG, THALLIUM STRESS ECHO, SESTAMIBI EBCT, OR OTHER PERFUSION OR IMAGING TEST WITHIN |
| NT PRO-BNP ≤100 (AGE 60-70) |
| ORGAN TRANSPLANT (AWAITING OR RECIPIENT) |
| OSTEOMYELITIS |
| PANCREATIC DISORDER |
| PARKINSON'S DISEASE |
| POLYCYSTIC KIDNEY DISEASE |
| POLYCYTHEMIA |
| PREGNANT WITH GESTATIONAL DIABETES/TOXEMIA/ECLAMPSIA/PRE-ECLAMPSIA |
| PSA ABNORMALITY |
| QUADRIPLEGIA |
| RENAL FAILURE (CHRONIC KIDNEY DISEASE) |
| RHEUMATOID DISORDERS INCLUDING RHEUMATOID ARTHRITIS AND LUPUS |
| SEVERE COPD/EMPHYSEMA (ON OXYGEN OR DISABLING) |
| SIGNIFICANT PSYCHIATRIC ILLNESS (INCLUDES BIPOLAR DISORDER, PSYCHOTIC DISORDER, AND SCHIZOPHRENIA) |
| SIGNIFICANT RESPIRATORY DISORDER (INCLUDES COPD, PULMONARY EMBOLISM, AND PULMONARY NODULES) |
| STROKE OR TIA |
| SUICIDE ATTEMPT |
| SUICIDE ATTEMPT IN THE LAST YEAR |
| TERM INSURANCE AGE > 70 & RATED OVER TABLE D OR WITH A FLAT EXTRA |
| ULCERATIVE COLITIS (AND SIMILAR DISORDERS) |
| UNTREATED BLOOD PRESSURE 120/80 OR BETTER (AGE 40-70) MAINTAINED FOR PAST 6 MONTHS |
| VALVE REPLACEMENT WITHIN 6 MONTHS |
| VALVULAR HEART DISEASE (INCLUDES MITRAL REGURGITATION, MITRAL STENOSIS, AORTIC REGURGITATION, AORTIC STEN |

⊙ KEYWORD SIGNAL

QUESTIONS 1012

The questions underwriters need answered for submissions.

You haven't configured any questions yet.

⊕ Question

1014

1100

Guidelines

Specify which keywords and classifications should affect your risk appetite for your Generali line of business.

1102

| SIC Code Signals |
|---|
| Matching any of these codes adjusts the risk score appropriately. |

| | |
|---|---|
| 2002 · Cheese; Natural and Processed | ⇧ ✎ |
| 214 · Sheep and Goats | ⇩ ✎ |
| 241 · Dairy Farms | ⇩ ✎ |
| 2869 · Industrial Organic Chemicals, Nec | ⇧ ✎ |
| 3312 · Blast Furnaces and Steel Mills | ⇩ ✎ |
| 3316 · Cold Finishing of Steel Shapes | ⇩ ✎ |
| 3317 · Steel Pipe and Tubes | ⇩ ✎ |
| 3545 · Machine Tool Accessories | ⇧ ✎ |
| 3556 · Food Products Machinery | ⇧ ✎ |
| 3559 · Special Industry Machinery, Nec | ⇧ ✎ |
| 4110 · Local Passenger Transportation, Nec | ⇧ ✎ |
| 4482 · Ferries | ⇧ ✎ |
| 5137 · Women's and Children's Clothing | ⇩ ✎ |
| 5912 · Drug Stores and Proprietary Stores | ⇧ ✎ |
| 7373 · Computer Integrated Systems Design | ⇧ ✎ |
| 8734 · Testing Laboratories | ⊘ ✎ |
| 8742 · Management Consulting Services | ⇧ ✎ |
| 8748 · Business Consulting, Nec | ⇧ ✎ |
| 9532 · Urban and Community Dovelopment | ⇧ ✎ |

1104

1106

1108

⊕ SIC Code Signal — 1110

Risk Signals
We will identify and highlight semantically matching words and adjust the risk score appropriately

| | |
|---|---|
| Best Practices | ⬇ ✎ |
| BreachID | ⬇ ✎ |
| Bring Your Own Device (BYOD) | ⬇ ✎ |
| Canada | ⬇ ✎ |
| Canada Parented Company | ⬇ ✎ |
| Canada Subsidiary | ⬇ ✎ ~1116 |
| CISO | ⬆ ✎ ~1118 |
| Confidential Client Information | ✎ |
| Encrypted Data | ⬆ ✎ |
| Intellectual Property Trade Secrets | ✎ |
| ISA 95 Compliant | ⬆ ✎ |
| Legacy Equipment/Operating Systems | ⬇ ✎ |
| MongoDB | ⬇ ✎ |
| North America Presence | ⬇ ✎ |
| Number of Branches/sites | ✎ |
| Number of Employees | ✎ |
| Open DNS Resolver | ⬇ ✎ |
| Oracle Database | ⬇ ✎ |
| PII/PHI/PCI | ✎ |
| RDP Protocol (MS Windows "Remote Desktop") | ✎ |
| Remote Diagnostics/External Access | ✎ |
| Test | ✎ |
| United States | ⬇ ✎ |
| United States (US) Subsidiary | ⬇ ✎ |
| US Parent Company | ⬇ ✎ |

⊕ Keyword Signal ~1120

ANALYZING SUBMISSION FOR RISK ASSESSMENT BASED ON RULE SET

TECHNICAL FIELD

The present disclosure relates generally to submission analysis and, more specifically, to analyzing one or more electronic submissions based on a rule set to generate a risk assessment of an applicant for insurance underwriting.

BACKGROUND

Insurance underwriting is the process of evaluating and analyzing a request (e.g., an application or other submission) for insurance coverage of a person, an organization, or an asset or an asset for one or more underwriting risks. In addition, insurance underwriting can include establishing pricing for accepted insurable risks.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 6 through FIG. 9 illustrate example graphical user interfaces for displaying information from example risk assessments generated in accordance with some embodiments.

FIG. 10A and FIG. 10B illustrate graphical user interface for displaying rules and risk parameters for risk signals being detected for a life insurance carrier, in accordance with some embodiments.

FIG. 11A through FIG. 11C illustrate an example graphical user interface 1100 for displaying code-based risk signals and risk parameters for an insurance carrier, in accordance with some embodiments.

DETAILED DESCRIPTION

Figure 1:
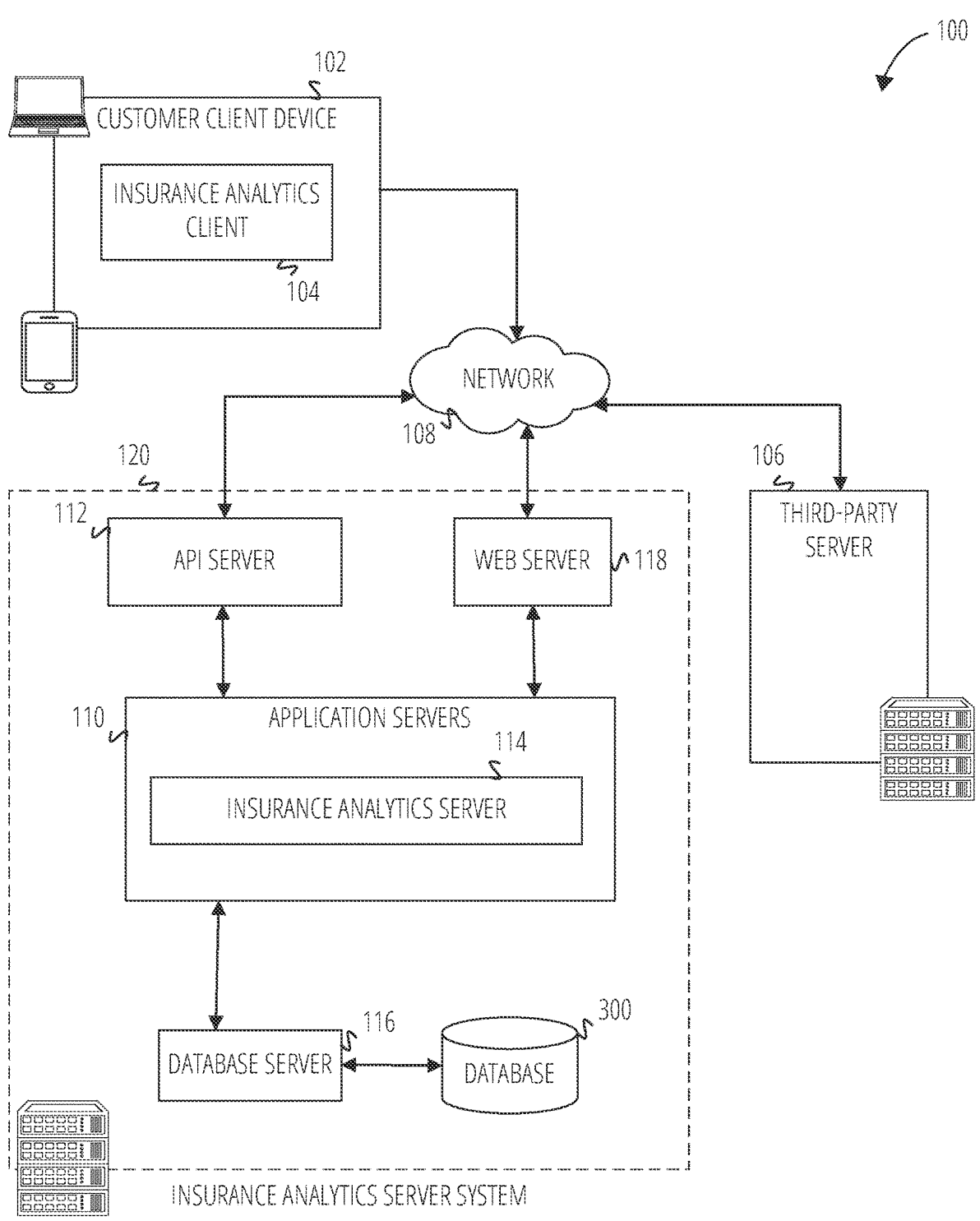
FIG. 1 is a diagrammatic representation of an example insurance analytics system in a networked environment in which the present disclosure may be deployed, in accordance with some embodiments.

Insurance underwriting is the process of evaluating and analyzing a request (e.g., an application or other submission) for insurance coverage of a person, an organization, or an asset or an asset for one or more underwriting risks. When an insurance carrier determines whether to provide an insurance policy (or insurance coverage) to an applicant, a human underwriter employed by the insurance carrier typically reviews one or more submissions provided by the applicant (e.g., applications, questionnaires, and other documentation), determine a risk associated with the applicant based on the review, and determines whether the risk associated with the applicant is within a risk appetite of the insurance carrier (e.g., as described by the insurance carrier's underwriting manual).

Various embodiments described herein provide for one or more electronic submissions of an applicant based on a rule set and generate a risk assessment of the applicant based on the analysis. In particular, some embodiments described herein analyze one or more electronic submissions for an applicant of an insurance policy (or insurance product) based on (e.g., in view of) a rule set (e.g., structured, machine-readable rule set) that describes one or more rules, guidelines, or parameters that codify an insurance carrier's risk appetite, and generating a risk assessment for the applicant based on the analysis, where the risk assessment can include without limitation a risk summary, a risk classification, a risk score, a listing of detected risk signals (e.g., with explanations for detections), or some combination thereof for the applicant.

As used herein, a risk summary for an applicant can provide a summary of codes detected with respect to the applicant, and why or where the codes were detected. A risk classification for an application can identify the applicant's status qualifying for an insurance policy from an insurance carrier, where the risk classification can be determined based on one or more of: the applicant's risk summary, the applicant's detected risk signals; or the applicant's risk score (also referred to herein as applicant's risk rating). Examples risk classifications can include, without limitation, qualified, disqualified, undesirable risk, and optimal risk. A risk signal can represent a risk factor being considered (e.g., detected) with to an applicant by an insurance carrier for underwriting purposes. A risk score of an applicant can be determined (e.g., calculated) based on one or more risk signals detected with respect to the applicant. Examples of insurance policies (or insurance products) being considered for an applicant can include, without limitation, a life insurance policy, a vehicle insurance policy, a home insurance policy, or a commercial insurance policy, such as a property and casualty (P&C) insurance policy.

An electronic submission from an applicant can be any electronic document or digital data provided by, or on behalf of, the applicant, where the electronic document or digital data can comprise unstructured data relating to the applicant. Examples of submissions include an electronic document representing an insurance application, applicant answers/responses to an electronic questionnaire, an electronic document representing an underwriting support document (e.g., medical assessment) included with the insurance application, and the like. An electronic submission can comprise unstructured data regarding an applicant. An electronic submission can also include data from a third-party data source, which can be external to a system (e.g., an insurance analytics system) described herein.

Various embodiments use a structured, machine-readable rule set (e.g., that describes or codifies an insurance carrier's one or more rules, guidelines, or parameters for underwriting) to analyze the applicant's one or more submissions. In particular, for various embodiments, the structured, machine-readable rule set describes a set of risk signals to be detected for with respect to an applicant. The structured, machine-readable rule set can describe the the set of risk signals to be detected by comprising one or more individual rules (e.g., risk appetite rules) for identifying (e.g., detecting) individual risk signals of the set of risk signals with respect to an applicant. The structured, machine-readable rule set can be generated from unstructured data (e.g., the insurance underwriting manual) that describes the insurance carrier's one or more rules, guidelines, or parameters for underwriting insurance policies.

An individual risk assessment (e.g., the risk summary, the risk classification, the risk score, or the listing of detected risk signals) can be generated with respect to an individual applicant with respect to a select insurance carrier. Each individual risk assessment generated for the individual applicant can correspond unwriting of an insurance policy by a different insurance carrier. Additionally, each individual risk assessment generated for the individual applicant can correspond to a different type of insurance policy (e.g., provided by the same insurance carrier, or by different insurance carriers).

The risk assessment can provide a user (e.g., a human underwriter) with a risk summary, a risk classification, a risk score, or a listing of detected risk signals for an applicant, which the user then uses to decide whether an insurance policy will be issued to the applicant. In general, an individual risk assessment can represent a concise risk profile of an applicant optimized for insurance risk analysis by a given insurance carrier or for a given type of insurance policy (e.g., life insurance, commercial insurance, vehicle insurance, etc.). In particular, an individual risk assessment can summarize (e.g., with or without provided reasons) whether or not the individual applicant fits a risk appetite for an individual insurance carrier (e.g., in general, or with respect to a particular insurance policy). In this way, a generated risk assessment for an applicant can be used (e.g., by a user serving as an insurance underwriter) to assist in or otherwise facilitate an underwriting process for issuing or denying an insurance policy (or insurance coverage) to an applicant. Accordingly, some embodiments present a generated risk assessment to a user (e.g., a user serving as an insurance underwriter for an insurance carrier) through one or more graphical user interfaces accessible (e.g., on a client device) by the user. The one or more graphical user interfaces can enable the user to review the risk assessment or possibly adjust the risk assessment (e.g., adjust the generated risk summary or the generated risk classification). Any adjustments received from the user can be collected (e.g., as feedback) and used to adjust the submission analysis or risk assessment generation process (e.g., adjusting to a natural language processing or artificial intelligence technique using collected feedback). Additionally, any adjustments received from the user can result in a refresh of the risk assessment for the applicant based on adjustments. The one or more graphical user interfaces can further enable the user to facilitate an underwriting process (e.g., move the process forward) with respect to the applicant associated with the presented risk assessment. For example, the one or more graphical user interfaces can receive user input (e.g., via a graphical user interface element) that indicates the user's decision with respect to issuing or denying an insurance policy from the insurance carrier associated with the presented risk assessment. In another example, the one or more graphical user interfaces can receive user input that comprises one or more questions from the user regarding the applicant, which an embodiment described herein can answer (e.g., using a transformer-based language model) based on the risk assessment generated for the applicant.

Various embodiments of the present disclosure improve the functionality of underwriting systems and facilitate the traditional underwriting process by providing a technical solution for analyzing one or more electronic submissions for an applicant (which can comprise unstructured data regarding the applicant) in view of a customer's (e.g., insurance carrier's) risk appetite, and generating a risk assessment of the applicant in view of the customer's risk appetite. By providing a customer (or underwriter) with a generated applicant's risk assessment, and with the reasoning behind the generated risk assessment, an insurance analytics system (or the like) that uses a submission analysis methodology described herein can enhance capacity, accuracy and transparency of an insurance underwriting process. For example, the insurance analytics system that uses a submission analysis methodology described herein can facilitate efficient/quick risk review and analysis of an applicant in view of an insurance carrier's risk appetite, thereby saving time for end users, for applicants, and reducing computational resources/processing power traditionally used to facilitate an underwriting process.
Networked Computing Environment FIG. 1 is a block diagram showing an example insurance analytics system 100 in accordance with some embodiments. The insurance analytics system 100 can include multiple instances of a customer client device 102 and multiple instances of a third-party server 106.

The customer client device 102 is associated with a client of the insurance analytics system 100. Examples of clients include financial institutions, insurance companies, analytics companies, etc. An employee of the client (e.g., an underwriter, an administrative assistant, or other employee) can be the user of the customer client device 102.

Each of the customer client devices 102 hosts a number of applications, including an insurance analytics client 104. Each insurance analytics client 104 is communicatively coupled with an insurance analytics server system 120 and third-party servers 106 via a network 108 (e.g., communication network or the Internet). An insurance analytics client 104 can also communicate with locally-hosted applications using Applications Program Interfaces (APIs). The customer client devices 102 can also host a number of applications including Internet browsing applications (e.g., Chrome, Safari, etc.). The insurance analytics client 104 can also be implemented as a platform that is accessed by the customer client device 102 via an Internet browsing application or implemented as an extension on the Internet browsing application.

An insurance analytics client 104 is able to communicate and exchange data with the insurance analytics server system 120 via the network 108. The data exchanged between the insurance analytics client 104 and the insurance analytics server system 120, includes functions (e.g., commands to invoke functions) as well as payload data (e.g., underwriting manuals, risk submissions and applications, training material, feedback on the results and reporting provided).

The insurance analytics server system 120 can also communicate and exchange data with third-party server 106 to obtain further data and information on the customer, the applicants, as well as relevant standardized information (e.g., standardized codes). The third-party server 106 can be servers hosting different websites comprising this data and information.

The insurance analytics server system 120 supports various services and operations that are provided to the insurance analytics client 104. Such operations include access to the functionalities of the systems in insurance analytics server system 120. Data exchanges to and from the insurance analytics server system 120 are invoked and controlled through functions available via user interfaces (UIs) of the insurance analytics client 104.

The insurance analytics server system 120 provides server-side functionality via the network 108 to a particular insurance analytics client 104. While certain functions of the insurance analytics system 100 are described herein as being performed by either an insurance analytics client 104 or by the insurance analytics server system 120, the location of certain functionality either within the insurance analytics client 104 or the insurance analytics server system 120 may be a design choice. For example, it may be technically preferable to initially deploy certain technology and functionality within the insurance analytics server system 120 but to later migrate this technology and functionality to the insurance analytics client 104 where a customer client device 102 has sufficient processing capacity.

Turning now specifically to the insurance analytics server system 120, an Application Program Interface (API) server 112 is coupled to, and provides a programmatic interface to, application servers 110. The application servers 110 are communicatively coupled to a database server 116, which facilitates access to a database 300 that stores data from the third-party server 106 and customer client device 102 to be processed by the application servers 110. Similarly, a web server 118 is coupled to the application servers 110, and provides web-based interfaces to the application servers 110. To this end, the web server 118 processes incoming network requests over the Hypertext Transfer Protocol (HTTP) and several other related protocols.

The Application Program Interface (API) server 112 receives and transmits data between the customer client device 102 and the application servers 110. Specifically, the Application Program Interface (API) server 112 provides a set of interfaces (e.g., routines and protocols) that can be called or queried by the insurance analytics client 104 in order to invoke functionality of the application servers 110. The Application Program Interface (API) server 112 exposes to the insurance analytics client 104 various functions supported by the application servers 110, including generating information the risk evaluation of submissions, risk appetite result, inconsistency findings, etc.

The application servers 110 host a number of server applications and subsystems, including for example an insurance analytics server 114. The insurance analytics server 114 implements a number of data processing technologies and functions, particularly related to the processing of the customer's risk appetite, the risk analysis of submissions or applications, and the identification of inconsistencies in submissions requiring analysis of a plurality of sources. To perform these functions, the insurance analytics server 114 can also implement machine-learning solutions, neural networks, generative artificial intelligence (AI), natural language processing (NLP) techniques, etc. Other processor and memory intensive processing of data may also be performed server-side by the insurance analytics server 114, in view of the hardware requirements for such processing.

System Architecture

Figure 2:
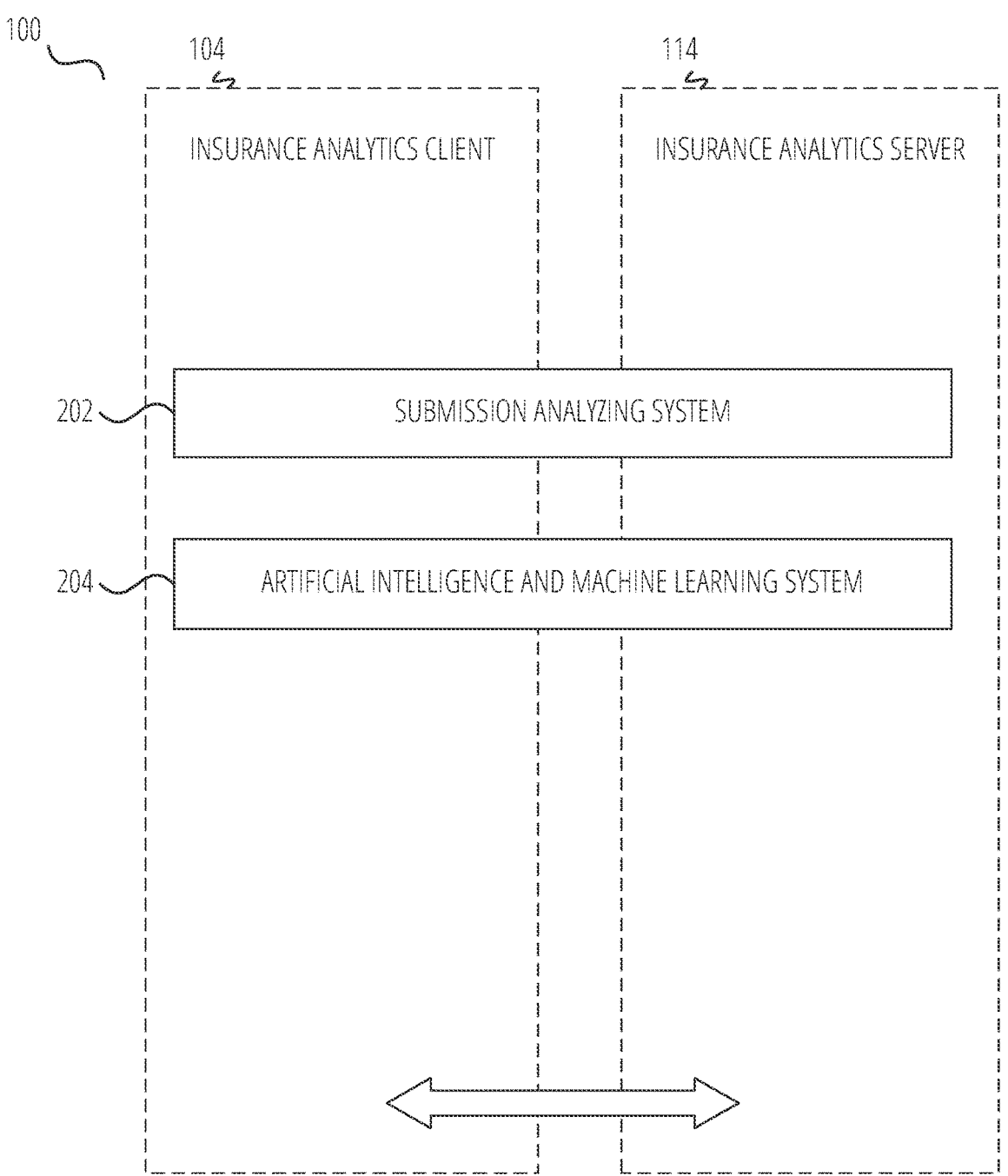
FIG. 2 is a diagrammatic representation of an example insurance analytics system, in accordance with some embodiments, that has both client-side and server-side functionality.

FIG. 2 is a block diagram illustrating further details regarding the insurance analytics system 100 according to some embodiments. Specifically, the insurance analytics system 100 is shown to comprise the insurance analytics client 104 and the insurance analytics server 114. The insurance analytics system 100 embodies a number of subsystems, which are supported on the client-side by the insurance analytics client 104 and on the server-side by the insurance analytics server 114. These subsystems include, for example, a submission analyzing system 202 and an artificial intelligence and machine learning system 204.

The submission analyzing system 202 is responsible for analyzing one or more electronic submissions for an applicant based on a structured, machine-readable rule set that describes a customer's (e.g., insurance carrier's) one or more rules, guidelines, or parameters for underwriting, and generating a risk assessment for the applicant based on the analysis, where the analysis can comprise one or more risk signals detected in the one or more electronic submissions, and where the risk assessment can include a risk summary for the applicant and a risk classification of the applicant. The one or more electronic submissions can be received from the customer client device 102, such as via the insurance analytics client 104. The submission analyzing system 202 can receive a structured, machine-readable rule set from a risk appetite defining system that ingests a customer's underwriting manual to extract rules (e.g., risk appetite rules) that codify the customer's risk appetite and generates the structured, machine-readable rule set as output.

The artificial intelligence and machine learning system 204 provides a variety of services to different subsystems within the insurance analytics system 100. For example, the artificial intelligence and machine learning system 204 can operate with the submission analyzing system 202 to analyze electronic submissions that are received and generate risk assessments based on the analysis.

Data Architecture

Figure 3:
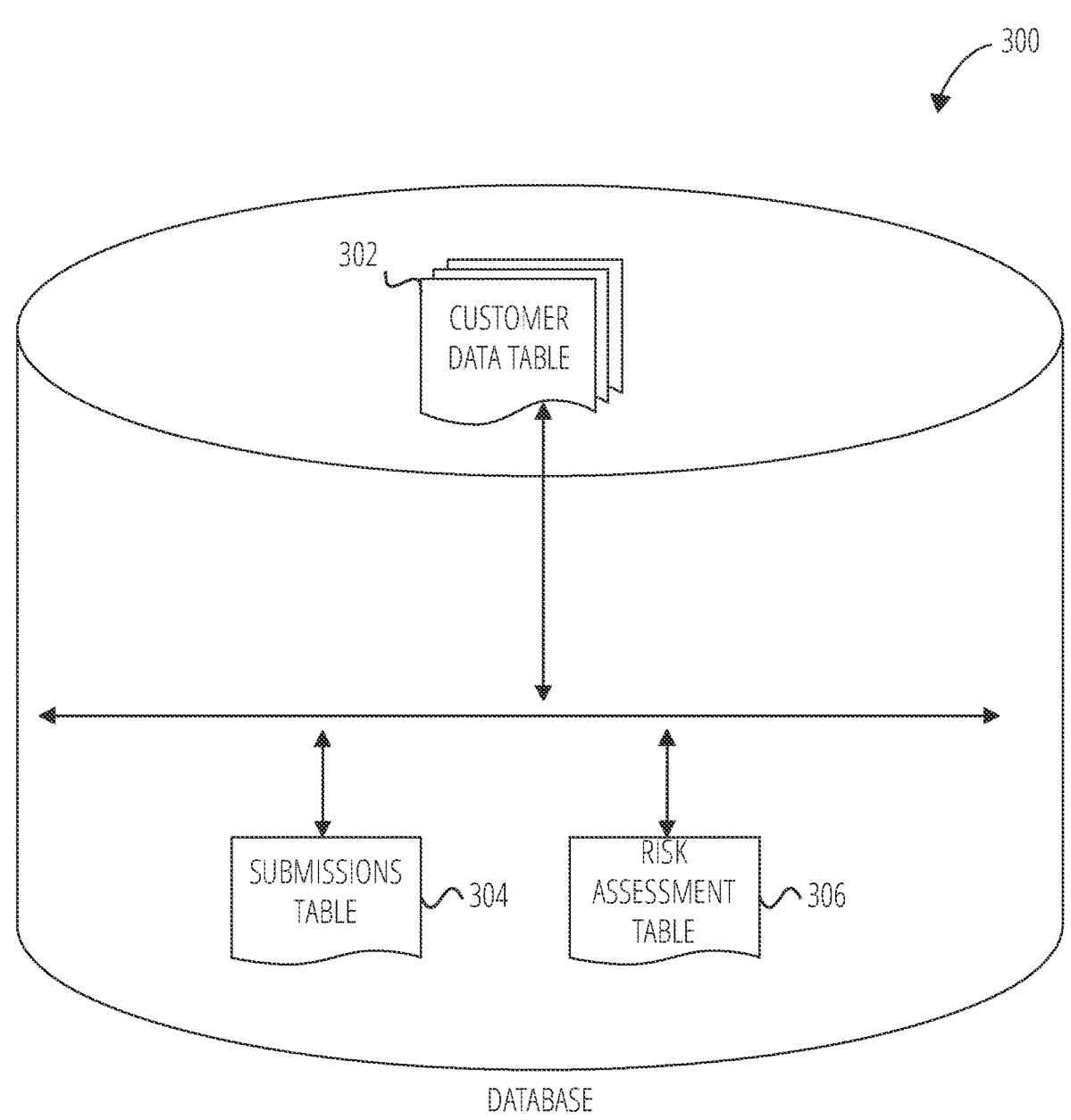
FIG. 3 is a diagrammatic representation of an example data structure as maintained in a database, in accordance with some embodiments.

FIG. 3 is a schematic diagram illustrating an example data structure, which may be stored in a database 300 of the insurance analytics server 114, according to some embodiments. While the content of the database 300 is shown to comprise a number of tables, it will be appreciated that the data could be stored in other types of data structures (e.g., as an object-oriented database).

The database 300 includes a customer data table 302, a submissions table 304, and a risk assessment table.

The customer data table 302 stores data related to the customers (or clients) of the insurance analytics system 100 including identification information, locations, business areas, etc. The customers can be, for example, an insurance carrier organization or company. The customer data table 302 also stores a structured, machine-readable set of rules (also referred to herein as a structured, machine-readable rule set) for each customer, where an individual structured, machine-readable rule set for an individual customer (e.g., individual insurance carrier) describes a set of rules, guidelines, or parameters used by the individual customer when underwriting one or more different types of insurance policies with respect to applicants. According to some embodiments, an individual structured, machine-readable rule set is generated for an individual customer based on the individual customer's underwriting manual, where the individual structured, machine-readable rule set comprises a set of risk appetite rules that codify a risk appetite of the individual customer for a given insurance policy. Depending on the embodiment, the individual structured, machine-readable rule set can be generated based on the guidelines and rules extracted from the underwriting manual, and feedback received from an individual customer via the customer client device 102.

The submissions table 304 stores one or more electronic submissions submitted by, on behalf of, an applicant in connection with an application for an insurance policy, where the application can be for an insurance policy from one possible individual customer (e.g., one insurance carrier) or from two or more possible customers (e.g., two or more possible insurance carriers). According to various embodiments, the one or more electronic submissions stored in the submissions table 304 in connection with an applicant can be submission analyzing system 202 to generate a risk assessment of the applicant for each of one or more customers (e.g., insurance carriers) and for each of one or more different types of insurance policies. As described herein, one or more electronic submissions stored in the submissions table 304 can include any electronic document or digital data received (e.g., from customer client device 102) for an applicant in connection with an application for an insurance policy, such as an electronic document representing an insurance policy application, responses to a questionnaire, or an electronic document representing a support document (e.g., medical report) provided with the insurance application. The submissions table 304 can store additional information and data obtained from third-party server 106 including scraped website data and third-party data feeds that are relevant to the application for the insurance policy. The submissions table 304 can store data related to the standardized insurance or classification codes that are obtained via training of the submission analyzing system 202 or from third-party server 106. The submissions table 304 can further store the standardized codes in association with the application for the insurance policy.

The risk assessment table 306 stores risk assessment data generated for an applicant, by the submission analyzing system 202, in connection with an application for an insurance policy from a customer (e.g., insurance carrier). According to some embodiments, the submission analyzing system 202 is configured to analyze (based on a structured, machine-readable rule set for a customer) one or more electronic submissions associated with an applicant's application for an insurance policy from the customer, generate the risk assessment data for the applicant based on the analysis, and store the generated risk assessment data on the risk assessment table 306. As described herein, risk assessment data for an applicant can comprise one or more of a risk summary, risk classification, a risk score, and a summary of detected risk signals for the applicant in view of a customer's (e.g., insurance carrier's) risk appetite, as described by the structured, machine-readable rule set.

Figure 4:
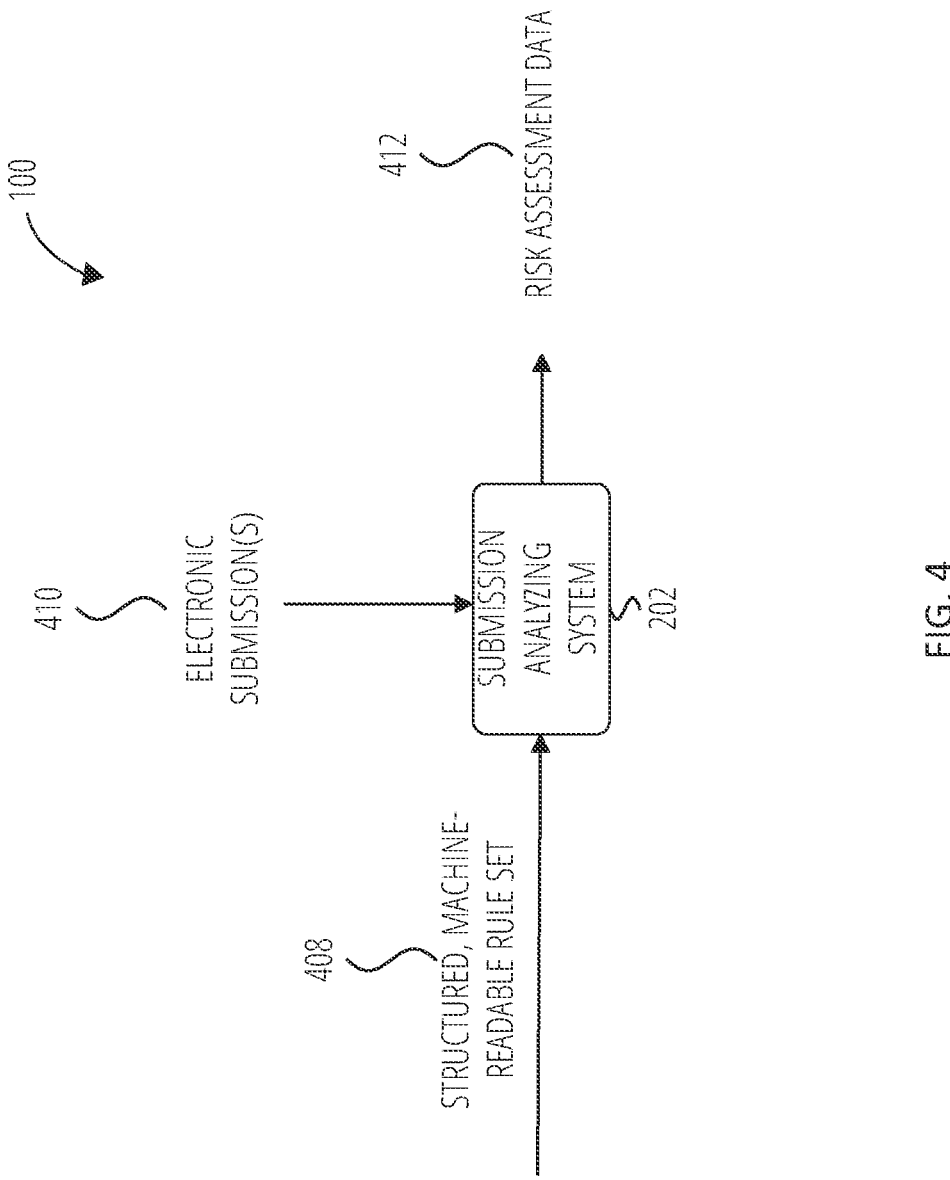
FIG. 4 illustrates an example insurance analytics system as being configured to analyze one or more electronic submissions of an applicant based on a rule set and generate a risk assessment of the applicant based on the analysis, in accordance with some embodiments.

FIG. 4 illustrates the insurance analytics system 100 as being configured to analyze one or more electronic submissions of an applicant based on a rule set and generate a risk assessment of the applicant based on the analysis, in accordance with some embodiments. For example, the extracted rules and determined risk parameters correspond to a risk appetite for an insurance carrier.

As shown in the example of FIG. 4, the insurance analytics system 100 includes the submission analyzing system 202 of FIG. 2. While not shown in FIG. 4, the submission analyzing system 202 may access or otherwise interact with the artificial intelligence and machine learning system 204 of FIG. 2. Additionally, though not shown in FIG. 4, the submission analyzing system 202 may access or otherwise interact with a risk appetite defining system, which can generate and provide the submission analyzing system 202 with a structured, machine-readable rule set 408 that describes one or more rules, guidelines, or parameters of a customer's (e.g., insurance carrier's) underwriting process.

According to various embodiments, the submission analyzing system 202 is configured to access submission data associated with an application for underwriting an insurance policy for an applicant, where the submission data comprises one or more electronic submissions 410 from the applicant. Additionally, for various embodiments, the submission analyzing system 202 is configured to process the submission data to generate structured, applicant data (e.g., a JavaScript Object Notation (JSON) object) for the applicant, where the structured, applicant data can comprise applicant information relevant for insurance risk analysis. At least some portion of the applicant information within the structured, applicant data can be extracted from at least one of the one or more electronic submissions. The submission analyzing system 202 can use at least one of a natural language processing technique or an artificial intelligence technique (e.g., provided by artificial intelligence and machine learning system 204) to process the submission data. For example, the submission analyzing system 202 can operate in conjunction with the artificial intelligence and machine learning system 204 to generate an applicant summary based on information extracted from the one or more electronic submissions 410, and to identify language or information from the applicant summary can be included in the structured, applicant data. Additionally, the submission analyzing system 202 can operate in conjunction with the artificial intelligence and machine learning system 204 to identify one or more classifications (e.g., code-based classifications) for an applicant based on information extracted from the one or more electronic submissions 410.

For some embodiments, the submission analyzing system 202 is configured to access risk appetite data for an insurance carrier (or customer) selected for underwriting the insurance policy, where the risk appetite data comprises a structured, machine-readable rule set 408 that describes one or more rules, guidelines, or parameters of an underwriting process used by the insurance carrier. Additionally, for some embodiments, the submission analyzing system 202 is configured to analyze the structured, applicant data based on the structured, machine-readable rule set 408 to generate risk assessment data 412 for the applicant, which can represent a risk assessment of the applicant with respect to the insurance carrier's risk appetite. The submission analyzing system 202 can use at least one of a natural language processing technique or an artificial intelligence technique (e.g., provided by artificial intelligence and machine learning system 204) to analyze the structured, applicant data. For example, the submission analyzing system 202 can operate in conjunction with the artificial intelligence and machine learning system 204 to match (e.g., semantically match) at least a portion of the structured, applicant data to one or more risk signals in a set of risk signals described by the structured, machine-readable rule set 408. The risk assessment data 412 comprises at least one of a risk classification for the applicant or a risk summary for the applicant. The risk assessment data 412 can additionally comprise a summary of detected risk signals or a risk score (e.g., determined based on values of detected risk signals). The submission analyzing system 202 can be configured to eventually cause at least a portion of the risk assessment data 412 (e.g., the risk classification, the risk summary, or both) to be displayed in a graphical user interface accessible to a client device (e.g., customer client device 102). More regarding the operation of submission analyzing system 202 is described herein with respect to process 500 of FIG. 5.

According to various embodiments, the artificial intelligence and machine learning system 204 implements or otherwise accesses a combination of neural network models (e.g., generative artificial intelligence models) in order to support processing of the one or more electronic submissions 410 and to support analyzing of structured, applicant data. The combination of neural network models includes one or more large language models, and corresponds to transformer-based models which are fine-tuned on insurance data to understand the complex language and terminology in underwriting manuals. For example, the combination of neural network models includes one or more generative pre-trained transformers (e.g., OpenAI GPT, Anthropic Claude, and the like) in combination with additional models pre-trained on semantically matching keywords of risk signals with language found in structured, applicant data.

With respect to training the neural network models, these models may implement or otherwise access machine learning algorithm(s) configured to learn from existing data and make predictions about new data. For example, the machine learning algorithm(s) operate by building the neural network models from example training data in order to make data-driven predictions or decisions for using sets of rules (e.g., the structured, machine-readable rule set 408).

For some embodiments, the structured, machine-readable rule set 408 comprises a set of risk signals, where each risk signal can have an associated value (e.g., risk parameter) that represents a customer's (e.g., insurance carrier's) risk appetite with respect to the risk signal. When a risk signal is detected (e.g., present) with respect to an applicant, the value of the risk signal can cause an applicant's risk (e.g., risk score) to increase or decrease. Depending on the embodiment, a value associated with a given risk signal can be selected from a predefined range, such as like, dislike, qualify, or disqualify. Depending on the embodiment, the risk appetite defining system can generate structured, machine-readable rule set 408 based on one or more of a customer's documents, which can include an underwriting manual, one or more prior applications, or prior user feedback.

As used herein, an underwriting manual can refer to a document (e.g., electronic document containing unstructured data), provided by an insurance carrier, that establishes rules and requirements used by an underwriter to make decisions regarding the acceptance, modification, or rejection of an insurance application by the insurance carrier. Underwriting manuals can be different from one insurance carrier to the next. The underwriting manual can be provided by way of a customer client device 102, and can be stored within the customer data table 302 of the database 300. For example, with respect to property and casualty (P&C) insurance, an underwriting manual for an insurance carrier can establish rules and risk parameters for one or more of the following risk factors related to an applicant (e.g., a business): claims history; location; competitive risk; coverage limits; business structure; number of employees; annual income; building risks; business size; deductibles; industry; property; revenue; auto liability; business interruption; cyber risks; or equipment. In another example, with respect to life insurance, an underwriting manual for an insurance carrier can establish rules and requirements for one or more of the following risk factors related to an applicant (e.g., individual): age; health history; lifestyle; gender; tobacco use; occupation; finances; health; alcohol use; criminal history; driving record; hobbies; credit; heart disease; insurance history; obesity; or height.

According to some embodiments, the structured, machine-readable rule set 408 is structured in a manner so as to indicate one or more rules (e.g., risk appetite rules) for: code-based risk signals, keyword-based risk signals, and risk signals for questions and answers, or "Q&A". For example, with respect to P&C insurance, the structured, machine-readable rule set 408 can be structured in a machine-readable format to indicate rules for all of code-based risk signals, keyword-based risk signals, and risk signals for Q&A. On the other hand, for life insurance, the structured, machine-readable rule set 408 can be structured in a machine-readable format to indicate rules for items-based risk signals and risk signals for Q&A (and not code-based risk signals).

As used herein, code-based risk signals can correspond to risk signals detected based on standardized insurance codes (e.g., Standard Industrial Classification (SIC) codes, North American Industry Classification System (NAICS) codes, or Source Classification Codes (SCCs)) for identifying and defining a business, where each standardized insurance code can comprise a code value and a code description. A risk appetite defining system can determine the code-based risk signals for an insurance carrier based on an underwriting manual, one or more prior applications, or prior user feedback. For instance, to determine code-based risk signals, the risk appetite defining system can compare portions (e.g., text, image) of an underwriting manual against known classification databases (e.g., for NAICS codes, SIC codes, SCC) that include codes. An individual code-based risk signal that corresponds to a code (e.g., standardized code) can have a set of keywords extracted from the description of the code; detection of the individual code-based risk signal can be facilitated by the submission analyzing system 202 semantically matching the set of keywords associated with the individual keyword-based risk signal with an applicant's information (e.g., information provided by an applicant summary generated by the submission analyzing system 202 based on one or more electronic submissions for the applicant).

As used herein, keyword-based risk signals can correspond to risk signals detected based on the presence of one or more keywords. Detection of an individual keyword-based risk signal can be facilitated by the submission analyzing system 202 semantically matching a set of keywords associated with the individual keyword-based risk signal with an applicant's information (e.g., information provided by an applicant summary generated by the submission analyzing system 202 based on one or more electronic submissions for the applicant).

For some embodiments, a risk appetite defining system in conjunction with the artificial intelligence and machine learning system 204 generates the structured, machine-readable rule set 408 from unstructured data (e.g., text from an underwriting manual, one or more prior applications, or prior user feedback). For example, the risk appetite defining system in conjunction with the artificial intelligence and machine learning system 204 can select a value, from a predefined range of values (e.g., like, dislike, qualify, or disqualify) that represents the risk appetite for the insurance carrier with respect to a risk signal. In another example, the risk appetite defining system in conjunction with the artificial intelligence and machine learning system 204 can extract questions and answers (e.g., from various questions and answers in an underwriting manual), which can be associated with risk signals described by the structured, machine-readable rule set.

The structured, machine-readable rule set 408 can be stored in association with a respective customer (e.g., insurance carrier). For example, the structured, machine-readable rule set 408 and risk parameters can be stored within the customer data table 302 of the database 300.

The insurance analytics system 100 can employ one or more neural network models in analyzing an applicant's one or more electronic submissions and generating an applicant's risk assessment in view of a structured, machine-readable rule set. Additionally, the insurance analytics system 100 can provide graphical user interfaces that allow an end user (e.g., an underwriter of the insurance carrier) to review, and possibly manually modify or adjust, a risk assessment generated for an applicant, where the risk assessment can include one or more of a risk summary, a risk classification, a risk score, and a summary (e.g., listing) of detected risk signals.

As discussed further below with respect to FIG. 10A through FIG. 10B and FIG. 11A through FIG. 11C, the submission analyzing system 202 can provide graphical user interfaces for viewing or editing the structured, machine-readable rule set 408 and associated risk parameters. Moreover, the user (e.g., underwriter) can manually input or edit individual risk signals or risk parameters, and these edits are stored within the customer data table 302.

Process of Analyzing Submissions

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 5:
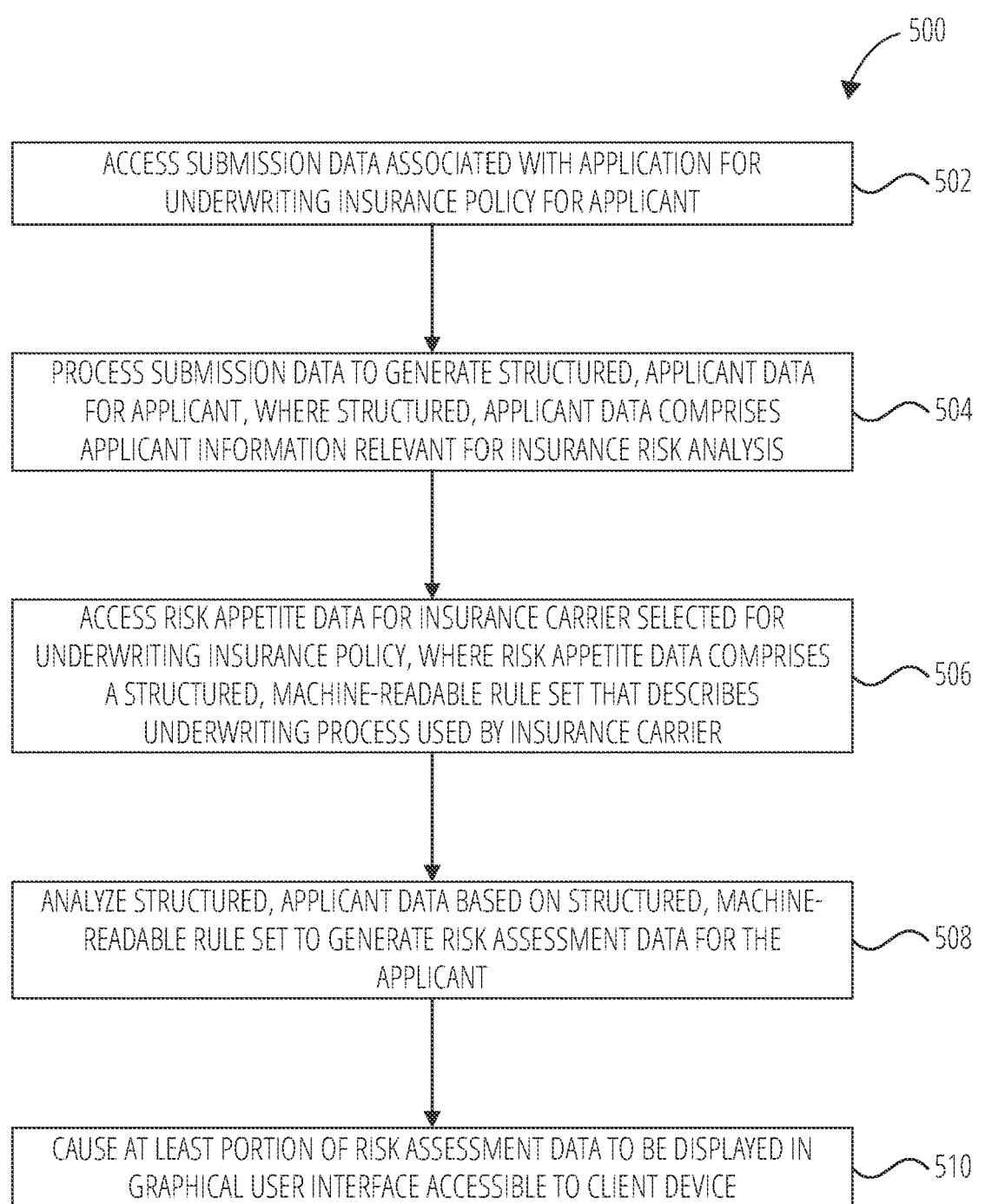
FIG. 5 is a flowchart illustrating an example process for analyzing one or more electronic submissions based on a rule set to generate a risk assessment of an applicant, in accordance with some embodiments.

FIG. 5 is a flowchart illustrating an example process 500 for analyzing one or more electronic submissions based on a rule set to generate a risk assessment of an applicant, in accordance with some embodiments. For explanatory purposes, the process 500 is primarily described herein with reference to the submission analyzing system 202 of FIG. 2, and the customer client device 102 of FIG. 1. However, one or more blocks (or operations) of the process 500 may be performed by one or more other components, or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown or one or more blocks (or operations) of the process 500 need not be performed or can be replaced by other operations. The process 500 may be terminated when its operations are completed. In addition, the process 500 may correspond to a method, a procedure, an algorithm, etc.

At operation 502, a processor (e.g., of submission analyzing system 202) accesses submission data associated with an application for underwriting an insurance policy for an applicant. The submission data can comprise one or more electronic submissions (e.g., 410) from the applicant. A given electronic submission can comprise information regarding the applicant in unstructured data.

For operation 504, the processor (e.g., of submission analyzing system 202) processes (e.g., analyzes) the submission data to generate structured, applicant data (e.g., a JSON object) for the applicant, where the structured, applicant data can comprise applicant information relevant for insurance risk analysis. At least some portion of the applicant information within the structured, applicant data can be extracted from at least one of the one or more electronic submissions. The structured, applicant data can represent an informational profile of the applicant generated from one or more unstructured data sources.

During operation 504, the processor can use at least one of a (first) natural language processing technique or a (first) artificial intelligence technique (e.g., provided by artificial intelligence and machine learning system 204) to process the submission data. For example, the processor can use at least one of a natural language processing technique or an artificial intelligence technique to generate an applicant summary (e.g., business or organization summary) based on one or more of the electronic submissions or based on online information gathered for the applicant from online resources. For instance, where the applicant is a non-human applicant (e.g., an organization or a business), operation 504 can comprise scraping at least one of website data or a third-party data feed for online information regarding the applicant. The scraping can be based on at least a portion of the submission data, which can provide information regarding the applicant, such as applicant's name (e.g., company or business name), physical address, or contact information, to search for and scrape applicant information from online resources, such as the applicant's own website(s) or third-party websites that provide information regarding organization/business. In another example, the processor can generate an applicant summary based on one or more of the electronic submissions or based on online information gathered for the applicant from online resources and then use at least one of a natural language processing technique or an artificial intelligence technique to determine a set of business classifications for the applicant based on the applicant summary and optionally further based on a set of standardized codes (e.g., SIC codes, NAICS codes, or SCCs). The structured, applicant data can be generated by the processor to include classification information extracted from the set of business classifications.

At operation 506, the processor (e.g., of submission analyzing system 202) accesses risk appetite data for an insurance carrier selected for underwriting the insurance policy, where the risk appetite data comprises a structured, machine-readable rule set (e.g., 408) that describes one or more rules, guidelines, or parameters of an underwriting process used by the insurance carrier.

For operation 508, the processor (e.g., of submission analyzing system 202) analyzes the structured, applicant data based on the structured, machine-readable rule set (e.g., 408) to generate risk assessment data (e.g., 412) for the applicant. The generated risk assessment data can comprise risk information as structured data and can be represented by a data object (e.g., JSON object). The risk assessment data generated can represent a risk assessment of the applicant with respect to the insurance carrier's risk appetite. The risk assessment data can comprise at least one of a risk classification for the applicant or a risk summary for the applicant. The risk assessment data can additionally comprise a summary of detected risk signals or a risk score (e.g., determined based on values of detected risk signals). By way of the information (e.g., risk summary, risk classification, risk score, detected risk signals, etc.) provided in the risk assessment data, the risk assessment data can describe whether or not the applicant fits a risk appetite of the insurance carrier.

During operation 508, the processor can use at least one of a (second) natural language processing technique or a (second) artificial intelligence technique to analyze the structured, applicant data. For example, the processor can use an artificial intelligence technique to generate the risk summary based on at least a portion of the structured, applicant data, where the artificial intelligence technique can comprise use of a transformer-based language model fine-tuned on domain-specific data. Alternatively or additionally, the processor can use at least one of a natural language processing technique or an artificial intelligence technique to semantically match at least a portion of the structured, applicant data to one or more risk signals in a set of risk signals (e.g., the risk signals being detected for by the insurance carrier) described by the structured, machine-readable rule set (e.g., 412). The semantic match can be found between information (e.g., text) within the structured, applicant data and a text (e.g., name, description, or keyword(s)) associated with an individual risk signal. The one or more risk signals semantically matched to a portion of the structured, applicant data can represent risk signals detected with respect to the applicant. The processor can then generate the risk summary based on at least the first portion of the structured, applicant data and the set of risk signals. In another example, the processor can generate a summary of detected risk signals based on the one or more (semantically matched) risk signals, where the risk assessment data comprises the summary of detected risk signals. Additionally, or alternatively, the processor can determine (e.g., calculate) a risk score for the applicant based on the one or more (semantically matched) risk signals. For instance, individual risk signals in the set of risk signals can be associated with a value (e.g., risk parameter) that either increases or decreases a risk score for the applicant. A risk signal that increases the risk score (or disqualifies the applicant) can be referred to as a negative risk signal, and a risk signal that decreases the risk score can be referred to as a positive risk signal. The value of a risk signal can be described within a range of predefined values (e.g., determined by an insurance carrier), and can represent the impact the risk signal has in determining whether the applicant fits within an insurance carrier's risk appetite. Based on the structured, machine-readable rule set (e.g., 408), the processor can determine (e.g., identify) the values (e.g., risk parameter) associated with individual risk signals in the one or more risk signals detected with respect to the applicant, and the processor can generate a risk score for the applicant based on the determined values (e.g., by aggregating the values). The processor can then generate the risk assessment data (e.g., 412) to include the risk score. Additionally, or alternatively, the processor can determine a risk classification for the applicant based on the risk score and generate the risk assessment data (e.g., 412) to include the risk classification.

For some embodiments, the set of risk signals detected for during operation 508 comprises a set of keyword-based risk signals, where each risk signal of the set of keyword-based risk signals is associated with one or more keywords or a description. Additionally, for some embodiments, the set of risk signals detected for during operation 508 comprises a set of code-based risk signals that is generated based on a set of standardized codes (e.g., SIC codes, NAICS codes, or SCCs) for defining and classifying businesses. Individual code-base keyboards can be associated with text (e.g., name, description, or keyword(s)) extracted from codes found in the set of standardized codes. Examples of code-based risk signals are illustrated and described with respect to FIG. 11A, and examples of keyword-based risk signals are illustrated and described with respect to FIG. 11B.

Eventually, at operation 510, the processor (e.g., of submission analyzing system 202) causes at least a portion of the risk assessment data (e.g., 412) to be displayed in a graphical user interface accessible to a client device (e.g., customer client device 102). Operation 510 can comprise generating data (e.g., web page data) that enables the graphical user interface to be displayed, or can comprise causing the rendering of the graphical user interface on a display of the client device. FIG. 6 through FIG. 9 illustrate and describe examples of portions of risk assessment data (e.g., generated by operation 508) being displayed in example graphical user interfaces 600, 700, 800, 900.

For process 500, an artificial intelligence technique used during any of the operations can comprise a set of neural network models. The set of neural network models can include a transformer-based language model, which may be fine-tuned on domain-specific data.

Figure 7:
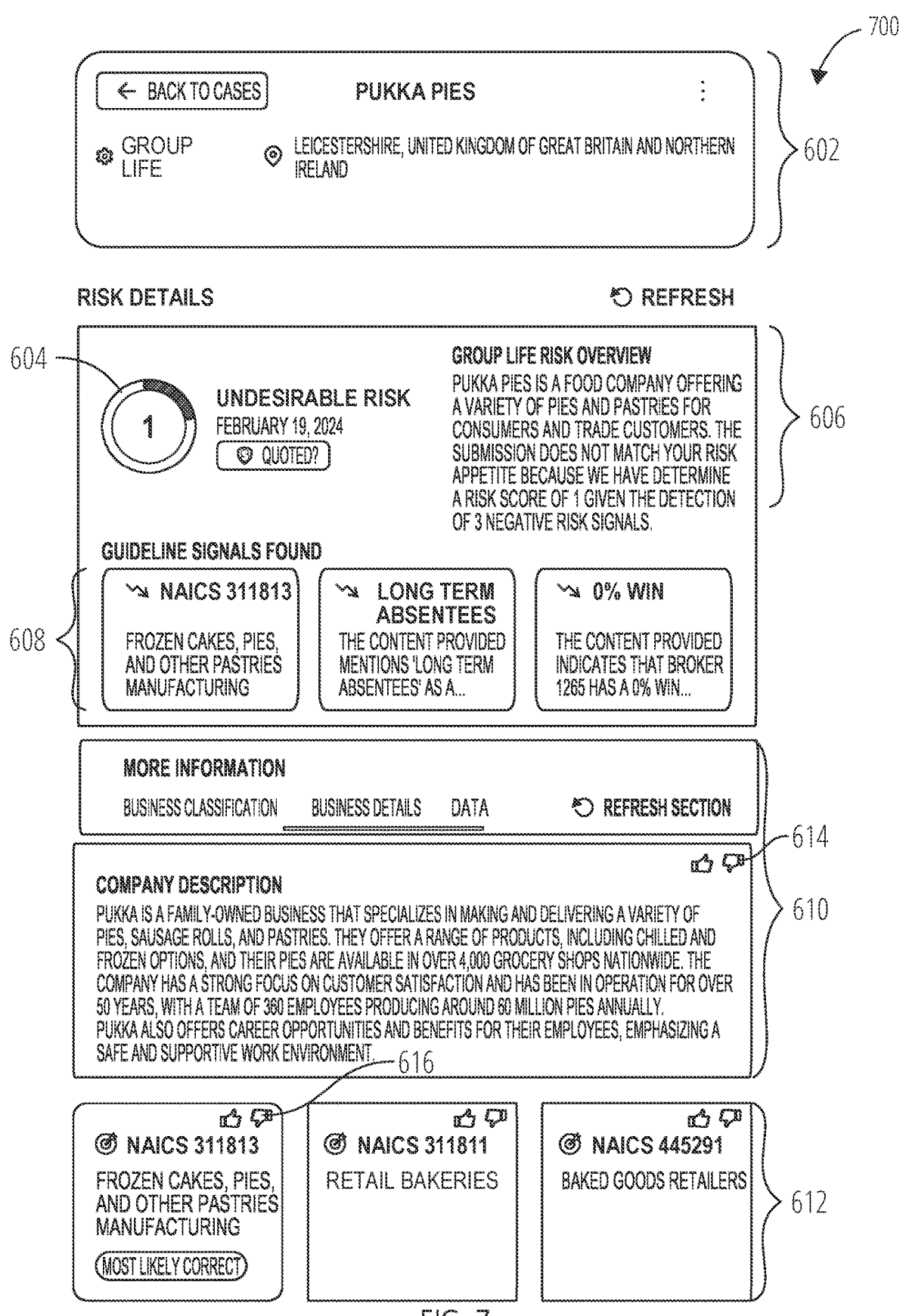
Figure 8:
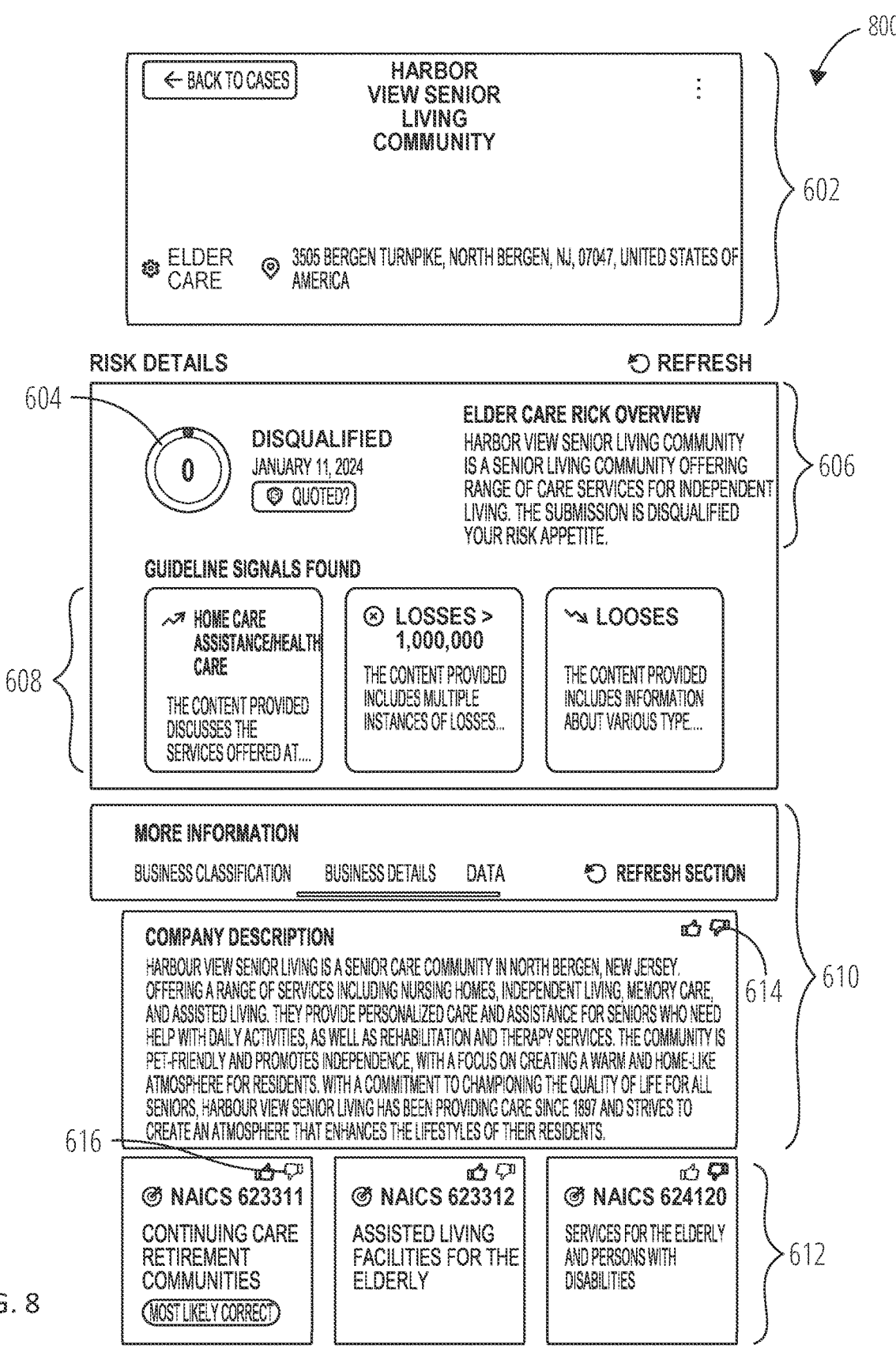
Figure 9:
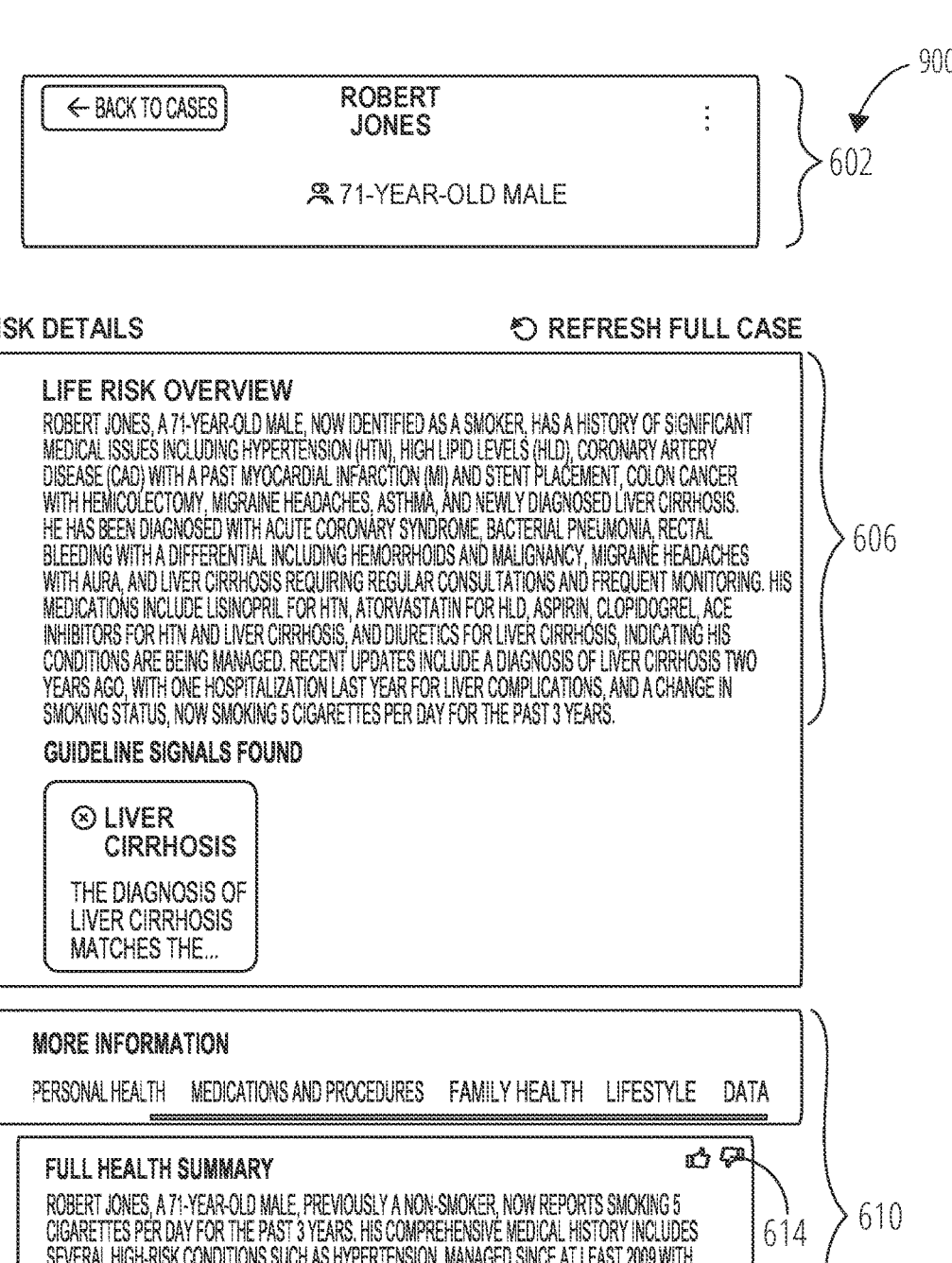

FIG. 6 through FIG. 9 illustrate example graphical user interfaces 600, 700, 800, 900 displaying information from example risk assessments generated in accordance with some embodiments. In particular, graphical user interfaces 600, 700, 800 of FIG. 6, FIG. 7, FIG. 8 respectively represent graphical user interfaces displaying information from risk assessment data and applicant data for non-human applicants (e.g., organizations or businesses), and graphical user interface 900 of FIG. 9 represents a graphical user interface displaying information from risk assessment data and applicant data for human applicant for a life insurance policy (or product).

Referring now to FIG. 6 through FIG. 8, each of graphical user interfaces 600, 700, 800 includes an applicant identification section 602, a risk rating section 604, a risk summary section 606, a detected risk signal summary section 608, an applicant information summary section 610, and a candidate risk signals section 612. As shown, the applicant identification section 602 can display information that identifies the applicant associated with the risk assessment information provided on the graphical user interface. The risk rating section 604 can display information regarding a risk score (e.g., ranging from a value of 0 to 5, with 0 representing disqualification and 5 representing qualified or optimal risk) of the applicant and a risk classification (e.g., qualified, disqualified, undesirable risk, acceptable risk, optimal risk, etc.) of the applicant (e.g., determined based on the risk score). The risk summary section 606 can provide a risk summary for the applicant. The detected risk signal summary section 608 can provide a summary (e.g., listing) of the one or more risk signals found (e.g., semantically matching) with respect to the applicant. In addition to listing the detected risk signals and providing a description of a detected risk signal, the detected risk signal summary section 608 can indicate a value or impact of a detected risk signal on the applicant (e.g., by a "up arrow" icon for a risk signal that reduces risk of the applicant, a "down arrow" icon for a risk signal that increases risk of the applicant, and a "circle X" icon for a risk signal that disqualifies the applicant). Each of the risk score, the risk classification, the risk summary, and the summary of detected risk signals can be provided by the risk assessment data (e.g., 412) generated for the applicant. The candidate risk signals section 612 can provide a summary (e.g., listing) of one or more additional, candidate risk signals that potentially can be applied to the applicant but presently not being considered for the risk score or the risk classification of the applicant. Through detected risk signal summary section 608, a user can apply or disregard a displayed risk signal with respect to the applicant by using the user feedback interface 616 (e.g., select the displayed "thumbs up" icon to apply to the applicant and the displayed "thumbs down" icon to disregard for the applicant). The user feedback received via the user feedback interface 616 can be used to adjust or modify the risk assessment data (e.g., 412) for the applicant. The user feedback received via the user feedback interface 616 can also be applied to adjust or train an artificial intelligence technique used by the submission analyzing system 202 (e.g., as feedback for finding risk signals). Risk signals presented in the candidate risk signals section 612 can represent those risk signals that were found/detected with respect to the applicant with lower confidence than the risk signals presented by the detected risk signal summary section 608. A confidence threshold can be used to determine which detected risk signals (e.g., from the risk assessment data 412) are displayed in detected risk signal summary section 608 and which detected signals are displayed in candidate risk signals section 612.

The applicant information summary section 610 can provide information from the structured, applicant data generated for the applicant, such as an applicant summary (e.g., business summary), applicant details (e.g., business details), and data gathered for the applicant (e.g., data scraped from online sources, such as employee count, physical location, revenue, state or country of incorporation, etc.). A user can indicate whether the information presented in the applicant information summary section 610 is correct or incorrect via user feedback interface 614. For instance, if a user believes the information presented in applicant information summary section 610 is correct, the user can select the displayed "thumbs up" icon, and if the user believes the information is incorrect, the user can select the displayed "thumbs down" icon.

Referring now to FIG. 9, as noted graphical user interface 900 represents a graphical user interface displaying information from risk assessment data and applicant data for human applicant for a life insurance policy (or product). Accordingly, graphical user interface 900 includes some but not all of the same sections as graphical user interfaces 600, 700, 800. In particular, graphical user interface 900 an applicant identification section 602, a risk summary section 606, a detected risk signal summary section 608, an applicant information summary section 610, and a candidate risk signals section 612. The risk signals detected for the human applicant, and displayed in detected risk signal summary section 608 and 612, include one or more medical risk signals (e.g., such as those illustrated and described with respect to FIG. 10A), and may exclude code-based risk signals used for organization and business applicants. Additionally, applicant information summary section 610 includes an applicant summary that provides personal information regarding the human applicant, including but limited to: a health summary of the human applicant; medications and procedures associated with the human applicant; family health history of the human applicant; lifestyle information for the human application; and additional data regarding the human applicant (e.g., age, height, weight, sex, ethnicity, place of residence, etc.).

Figure 10B:
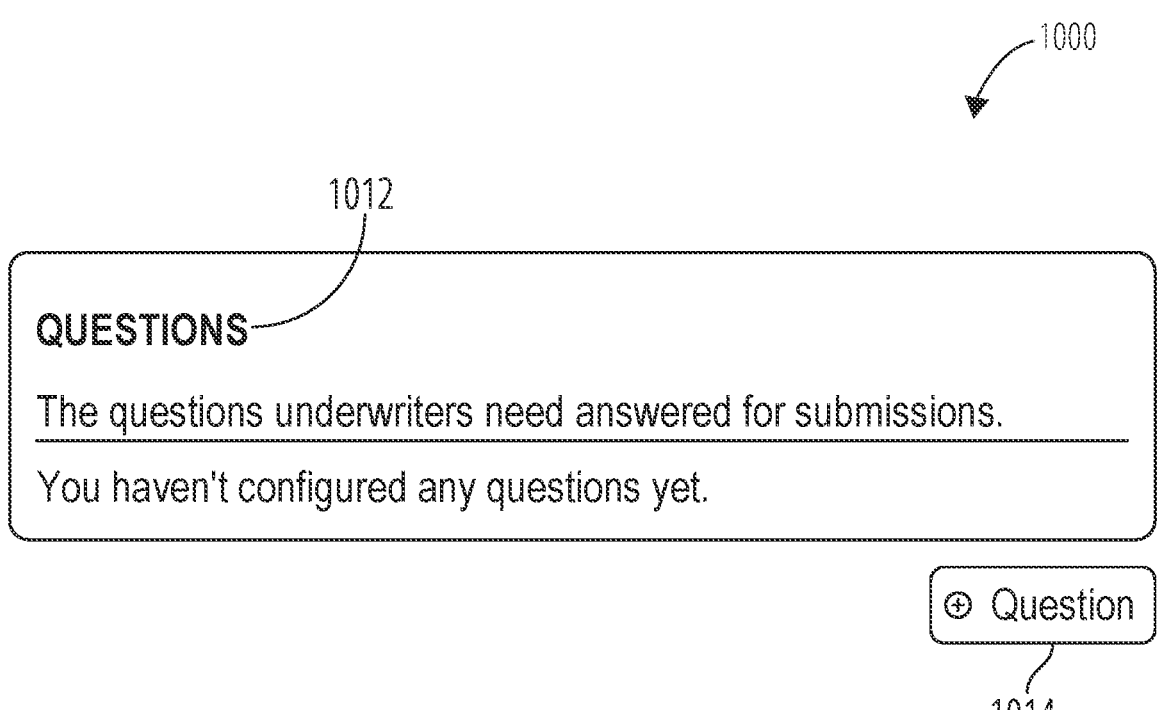

FIG. 10A and FIG. 10B illustrate an example graphical user interface 1000 for displaying rules and risk parameters for risk signals being detected for a life insurance carrier, in accordance with some embodiments. Though FIGS. 10A and 10B are illustrated in the context of a life insurance policy, some embodiments can use a similar graphical user interface for purposes of a commercial insurance policy. The graphical user interface 1000 is displayable on the customer client device 102, which is operated by a user (e.g., an underwriting employee, etc.) of the life insurance carrier. The graphical user interface 1000 is provided by the risk appetite defining submission analyzing system 202 and allows the user (e.g., underwriting employee) to view or edit rules of a structured, machine-readable rule set (e.g., 408) corresponding to risk appetite.

In the example of FIG. 10A, the graphical user interface 1000 includes a medical risk signals section 1002 with a list of medical risk signals. For each listed medical risk signal, the graphical user interface 1000 includes a respective description 1004, value 1006 and edit button 1008. The description 1004 can represent keywords used by various embodiments to semantically match the corresponding medical risk signal to an applicant based on the applicant's structured, applicant data.

As noted above, the rules corresponding to risk appetite for a prospective insured individual relate to one or more of the following factors: age; health history; lifestyle; gender; tobacco use; occupation; finances; health; alcohol use; criminal history; driving record; hobbies; credit; heart disease; insurance history; obesity; or height. The example of FIG. 10A includes multiple medical risk signals and risk parameters that generally relate to these factors.

For each listed medical risk signal in FIG. 10A, the graphical user interface 1000 provides for the user to view the description 1004 of the risk signal. For some embodiments, edit button 1008 is user-selectable to edit the description for a particular risk signal.

In addition, for each listed medical risk signal, the graphical user interface 1000 provides for the user to view or edit a corresponding value 1006 (e.g., risk parameter). As noted above, the value can be selected from a predefined range of values (e.g., like, dislike, qualify, or disqualify) based on rules extracted from an underwriting manual, one or more prior applications, or prior user feedback. In the example of FIG. 10A, the "like" value is depicted as an up arrow, the "dislike" value is depicted by a down arrow, and the "disqualify" value is depicted by a prohibition sign.

In example aspects, the value 1006 is user-selectable to edit the value for a particular risk signal. In this manner, the user may manually modify the rules (e.g., within the structured, machine-readable rule set 408) for a particular risk signal. Moreover, the add signal button 1010 is user-selectable to add a new risk signal description and value pair.

Thus, the graphical user interface 1000 provides for the user to modify the description or value for an existing risk signal, or to create a new risk signal with a corresponding description and value. According to some embodiments, the submission analyzing system 202 stores any manual updates within the database 300 (e.g., within the customer data table 302).

As shown in the example of FIG. 10B, the graphical user interface 1000 further includes a Q&A section 1012. While FIG. 10A and FIG. 10B are depicted as separate, the Q&A section 1012 can be displayed directly below the medical risk signals section 1002 within the graphical user interface 1000.

As noted above, the rules corresponding to risk appetite may include Q&A corresponding to a life insurance carrier. The questions and answers can be associated with risk signals that are considered/detected for when underwriting an applicant. The example of FIG. 10B does not include and Q&A pairs. However, the graphical user interface 1000 includes an add question button 1014, which is user-selectable to add one or more Q&A pairs to the set of rules (e.g., structured, machine-readable rule set 408) for the insurance carrier. While not shown in FIG. 10B, the graphical user interface 1000 may provide user-selectable elements for modifying existing Q&A pairs. The submission analyzing system 202 stores any manual updates within the customer data table 302.

Figure 11C:
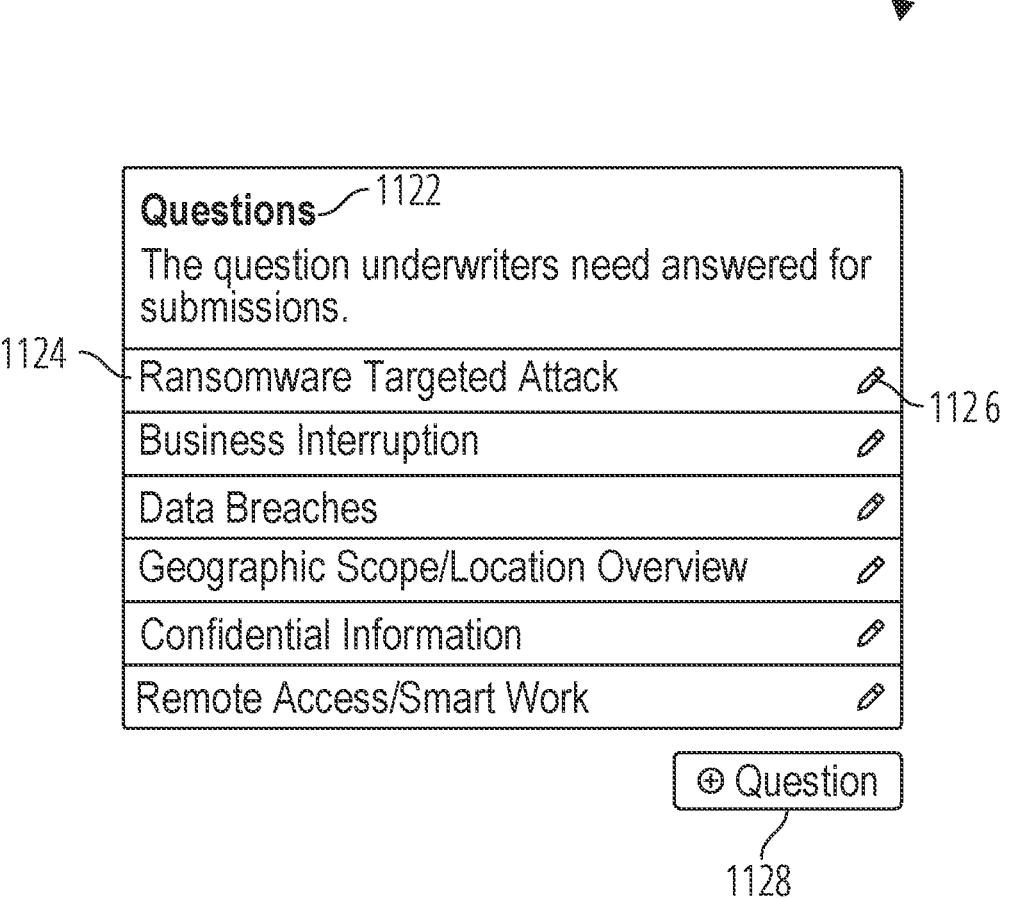

FIG. 11A through FIG. 11C illustrate an example graphical user interface 1100 for displaying code-based risk signals and risk parameters for an insurance carrier, in accordance with some embodiments. The graphical user interface 1100 is displayable on the customer client device 102, which is operated by a user (e.g., an underwriting employee, etc.) of the insurance carrier. The graphical user interface 1100 is provided by the submission analyzing system 202 and allows the user (e.g., underwriting employee) to view or edit rules of a structured, machine-readable rule set (e.g., 408) corresponding to risk appetite.

In the example of FIG. 11A, the graphical user interface 1100 includes a code-based risk signals section 1102 with a list of code-based risk signals. For each listed code-based risk signal, the graphical user interface 1100 includes a respective description 1104, value 1106 and edit button 1108. The description 1104 can represent keywords used by various embodiments to semantically match the corresponding code-based risk signal to an applicant based on the applicant's structured, applicant data.

As noted above, the rules corresponding to risk appetite for a prospective insured business may include code-based risk signals corresponding to standardized insurance codes (e.g., NAICS codes, SIC codes, SCC) for identifying and defining a business. The example of FIG. 11A includes multiple code-based risk signals.

For each listed code-based risk signal, the graphical user interface 1100 provides for the user to view the description 1104 of the risk signal (e.g., the code-based risk signal number and title). In example aspects, the edit button 1108 is user-selectable to edit the description (e.g., the code signal number and title) for a particular code-based risk signal.

In addition, for each listed code-based risk signal, the graphical user interface 1100 provides for the user to view or edit a corresponding value 1106. As noted above, the value is selected from a predefined range of values (e.g., like, dislike or disqualify), based on extracting rules from an underwriting manual, one or more prior applications, or prior user feedback.

In example aspects, the value 1106 is user-selectable to edit the value for a particular code-based risk signal. In this manner, the user may manually modify the rules for a particular code-based risk signal. Moreover, the add signal button 1110 is user-selectable to add a new code-based risk signal description and value pair.

Thus, the graphical user interface 1100 provides for the user to modify the description or value for an existing code-based risk signal, or to create a new code-based risk signal with a corresponding description and value. In example aspects, the submission analyzing system 202 stores any manual updates in the customer data table 302.

As shown in the example of FIG. 11B, the graphical user interface 1100 further includes a (general) risk signals section 1112. While FIG. 11A through FIG. 11C are depicted as separate, the risk signals section 1112 may be displayed directly below the code-based risk signals section 1102 within the graphical user interface 1100.

In the example of FIG. 11B, the risk signals section 1112 includes a list of risk signals. For each listed risk signal, the graphical user interface 1100 includes a respective risk signal description 1114, value 1116 and edit button 1118.

As noted above, the rules corresponding to risk appetite for a prospective insured business relate to one or more of the following factors: claims history; location; competitive risk; coverage limits; business structure; number of employees; annual income; building risks; business size; deductibles; industry; property; revenue; auto liability; business interruption; cyber risks; or equipment. The factors considered by an insurance carrier can differ based on industry or line of business (e.g., certain factors relate to, or are specifically required, by the insurance carrier for certain industries or lines of business). The example of FIG. 11B includes multiple risk signals that generally relate to these factors.

For each listed risk signal, the graphical user interface 1100 provides for the user to view the risk signal description 1114 of the corresponding risk signal. For some embodiments, the edit button 1118 is user-selectable to edit the description for a particular risk signal.

In addition, for each listed risk signal, the graphical user interface 1100 provides for the user to view or edit a corresponding value 1116 (e.g., risk parameter). As noted above, the value is selected from a predefined range of values (e.g., like, dislike or disqualify) based on rules extracted from an underwriting manual, one or more prior applications, or prior user feedback. The example of FIG. 11B includes values that are blank, for example, representing that there is no preference (e.g., like, dislike, or disqualify) indicated for those corresponding risk signals.

For some embodiments, the value 1116 is user-selectable to edit the value for a particular risk signal. In this manner, the user can manually modify the rules for a particular risk signal. Moreover, the add signal button 1120 is user-selectable to add a new risk signal description and value.

Thus, the graphical user interface 1100 provides for the user to modify the description or value for an existing risk signal, or to create a new risk signal with a corresponding description and value. For some embodiments, the submission analyzing system 202 stores any manual updates within the customer data table 302.

As shown in the example of FIG. 11C, the graphical user interface 1100 further includes a Q&A section 1122. While FIG. 11B and FIG. 11C are depicted as separate, the Q&A section 1122 may be displayed directly below the risk signals section 1112 within the graphical user interface 1100.

As noted above, the rules corresponding to risk appetite may include Q&A corresponding to an insurance carrier. For each listed Q&A pair 1124, the graphical user interface 1100 provides for the user to view the Q&A pair 1124, and to edit the Q&A pair 1124 via the edit button 1126.

In addition, the graphical user interface 1100 includes an add question button 1128 which is user-selectable to add one or more Q&A pairs to the set of rules for the insurance carrier. The submission analyzing system 202 can store any manual updates within the customer data table 302.

Machine Architecture

Figure 12:
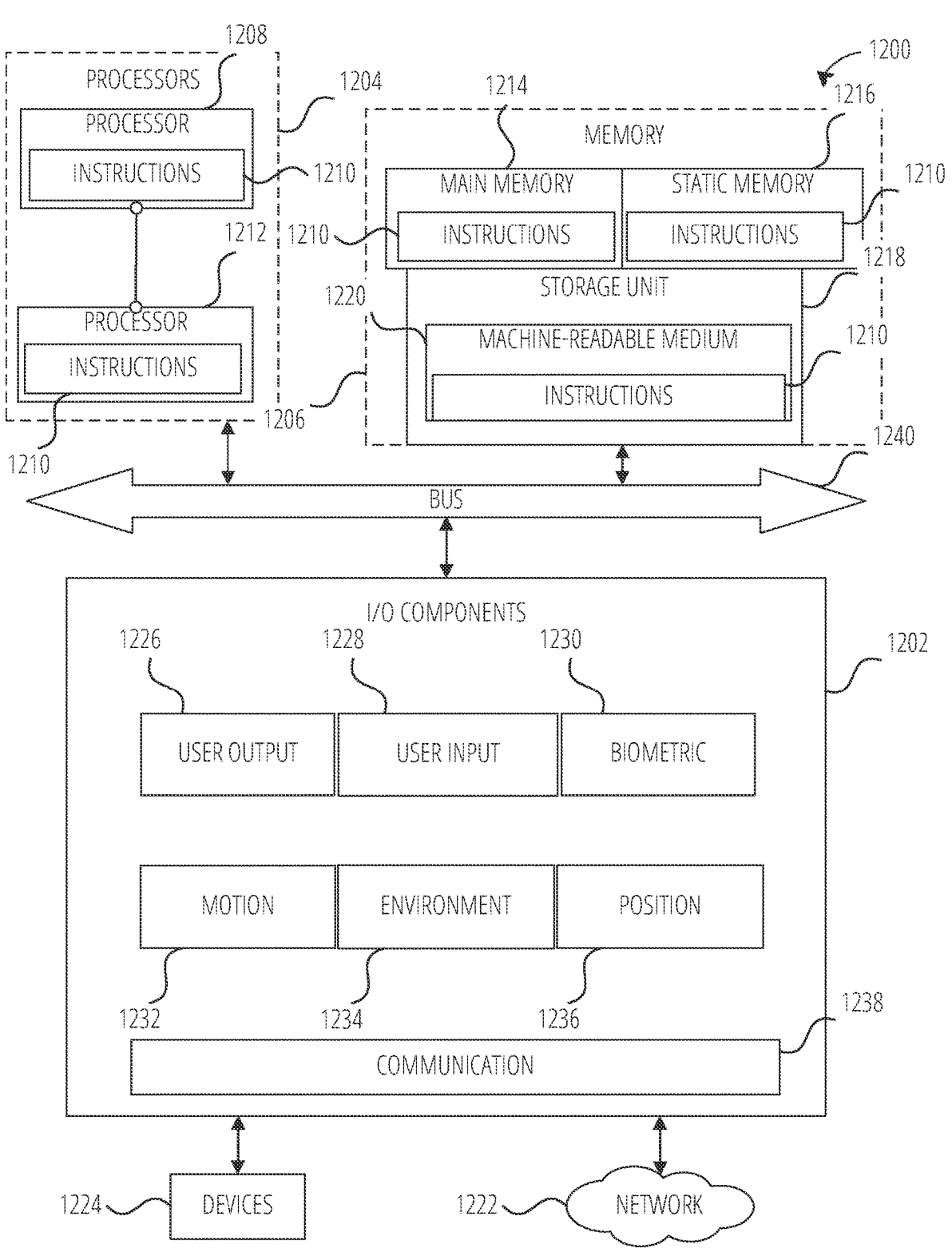
FIG. 12 is a diagrammatic representation of a machine in the form of a computer system within which a set of instructions may be executed for causing the machine to perform any one or more of the methodologies discussed herein, in accordance with some examples.

In some examples, components in the insurance analytics system 100 can be a machine 1200 as shown in FIG. 12. FIG. 12 is a diagrammatic representation of the machine 1200 within which instructions 1210 (e.g., software, a program, an application, an applet, an application, or other executable code) for causing the machine 1200 to perform any one or more of the methodologies discussed herein may be executed. For example, the instructions 1210 may cause the machine 1200 to execute any one or more of the methods described herein. The instructions 1210 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform any one or more of the methodologies discussed herein. The machine 1200, for example, may comprise the customer client device 102 or any one of a number of server devices forming part of the insurance analytics server 114. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1202, which may be configured to communicate with each other via a bus 1240. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1208 and a processor 1212 that execute the instructions 1210. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1214, a static memory 1216, and a storage unit 1218, both accessible to the processors 1204 via the bus 1240. The main memory 1214, the static memory 1216, and storage unit 1218 store the instructions 1210 embodying any one or more of the methodologies or functions described herein. The instructions 1210 may also reside, completely or partially, within the main memory 1214, within the static memory 1216, within machine-readable medium 1220 within the storage unit 1218, within at least one of the processors 1204 (e.g., within the processor's cache memory), or any suitable combination thereof, during execution thereof by the machine 1200.

The I/O components 1202 may include a wide variety of components to receive input, provide output, produce output, transmit information, exchange information, capture measurements, and so on. The specific I/O components 1202 that are included in a particular machine will depend on the type of machine. For example, portable machines such as mobile phones may include a touch input device or other such input mechanisms, while a headless server machine will likely not include such a touch input device. It will be appreciated that the I/O components 1202 may include many other components that are not shown in FIG. 12. In various examples, the I/O components 1202 may include user output components 1226 and user input components 1228. The user output components 1226 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1202 may include biometric components 1230, motion components 1232, environmental components 1234, or position components 1236, among a wide array of other components. For example, the biometric components 1230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 include acceleration sensor components (e.g., accelerometer), gravitation sensor components, rotation sensor components (e.g., gyroscope).

The environmental components 1234 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the customer client device 102 may have a camera system comprising, for example, front cameras on a front surface of the customer client device 102 and rear cameras on a rear surface of the customer client device 102. The front cameras may, for example, be used to capture still images and video of a user of the customer client device 102 (e.g., "selfies"). The rear cameras may, for example, be used to capture still images and videos in a more traditional camera mode. In addition to front and rear cameras, the customer client device 102 may also include a 3600 camera for capturing 360° photographs and videos.

Further, the camera system of a customer client device 102 may include dual rear cameras (e.g., a primary camera as well as a depth-sensing camera), or even triple, quad or penta rear camera configurations on the front and rear sides of the customer client device 102. These multiple cameras systems may include a wide camera, an ultra-wide camera, a telephoto camera, a macro camera and a depth sensor, for example.

The position components 1236 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1202 further include communication components 1238 operable to couple the machine 1200 to a network 1222 or devices 1224 via respective coupling or connections. For example, the communication components 1238 may include a network interface component or another suitable device to interface with the network 1222. In further examples, the communication components 1238 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (e.g., main memory 1214, static memory 1216, and memory of the processors 1204) and storage unit 1218 may store one or more sets of instructions and data structures (e.g., software) embodying or used by any one or more of the methodologies or functions described herein. These instructions (e.g., the instructions 1210), when executed by processors 1204, cause various operations to implement the disclosed examples.

The instructions 1210 may be transmitted or received over the network 1222, using a transmission medium, via a network interface device (e.g., a network interface component included in the communication components 1238) and using any one of several well-known transfer protocols (e.g., hypertext transfer protocol (HTTP)). Similarly, the instructions 1210 may be transmitted or received using a transmission medium via a coupling (e.g., a peer-to-peer coupling) to the devices 1224.

Software Architecture

Figure 13:
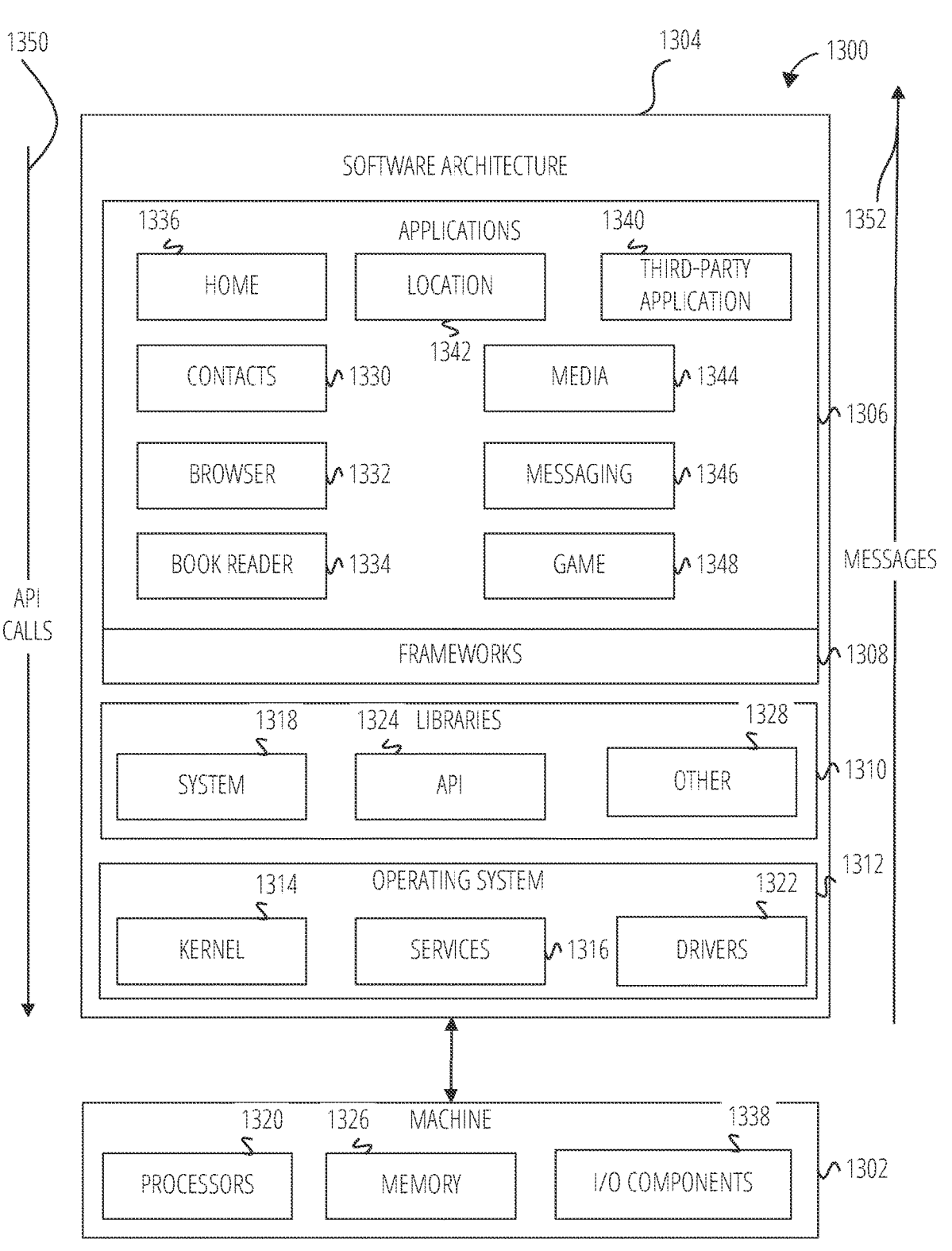
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionalities. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1204 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium"

mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A system comprising:

a processor, and a memory storing instructions that, when executed by the processor, cause the system to perform operations comprising:

accessing submission data associated with an application for underwriting an insurance policy for an applicant, the submission data comprising one or more electronic submissions from the applicant;

processing the submission data to generate structured applicant data for the applicant, wherein the processing of the submission data comprises using at least one of a natural language processing technique or an artificial intelligence technique to process the submission data, and wherein the structured applicant data comprises applicant information relevant for insurance risk analysis, and wherein at least some portion of the applicant information is extracted from at least one of the one or more electronic submissions;

accessing a risk appetite defining system for risk appetite data for an insurance carrier selected for underwriting the insurance policy, wherein the risk appetite data comprises a structured machine-readable rule set structured to indicate code signals, risk signals, and questions and answers that codify a risk appetite of the insurance carrier for unwriting insurance policies, and wherein the risk appetite defining system generates the structured machine-readable rule set by extracting the structured machine-readable rule ingesting unstructured text from an underwriting manual of the insurance carrier;

using one or more neural network models to analyze the structured applicant data based on the structured machine-readable rule set customized for the insurance carrier's risk appetite data and to generate risk assessment data for the applicant based on the analysis, wherein the one or more neural network models comprise one or more transformer-based language models fine-tuned on insurance data to understand complex language and terminology in underwriting manuals, wherein the using of the one or more neural network models to analyze the structured applicant data comprises:

using at least one neural network model of the one or more neural network models to semantically match at least a portion of the structured applicant data to a set of risk signals indicated in the structured machine-readable rule set;

determining a risk score for the applicant based on the set of risk signals, wherein an individual risk signal of the set of risk signals is associated with a value that either increases or decreases the risk score for the applicant; and determining at least one of a risk classification for the applicant based on the risk score, wherein the risk assessment data comprises:

a summary of detected risk signals based on the set of risk signals;

the risk score for the applicant; and the at least one risk classification for the applicant;

causing at least a portion of the risk assessment data to be displayed in a graphical user interface accessible to a client device, wherein the graphical user interface displays a first section and a second section, wherein the first section displays one or more risk signals from the summary of detected risk signals that each have a confidence above a confidence threshold, wherein the second section displays one or more risk signals from the summary of detected risk signals that each have a confidence below the confidence threshold, and wherein the second section comprises a user feedback interface for the one or more risk signals from the summary of detected risk signals that each have the confidence below the confidence threshold; and receiving, via the user feedback interface, user feedback to either apply or disregard at least one risk signal displayed in the second section with respect to the applicant, wherein the user feedback is used to adjust generation of the risk assessment data for the applicant.

2. The system of claim 1, wherein at least the portion of the structured applicant data comprises one or more electronic questionnaire responses extracted from the submission data during the processing of the submission data.

3. The system of claim 1, wherein the using of the one or more neural network models to analyze the structured applicant data comprises:

using at least one neural network model of the one or more neural network models to generate a risk summary based on at least a portion of the structured applicant data, wherein the at least one neural network model comprises a transformer-based language model fine-tuned on insurance data to understand complex language and terminology in underwriting manuals, and wherein the risk assessment data comprises the risk summary.

4. The system of claim 1, wherein the set of risk signals comprises a set of keyword-based risk signals, and wherein each risk signal of the set of keyword-based risk signals is associated with one or more keywords.

5. The system of claim 1, wherein the applicant is a non-human applicant, wherein the set of risk signals comprises a set of code-based risk signals, and wherein the set of code-based risk signals is generated based on a set of standardized codes for defining and classifying businesses.

6. The system of claim 5, wherein the set of standardized codes comprises at least one of Standard Industrial Classification (SIC) codes, North American Industry Classification System (NAICS) codes, or Source Classification Codes (SCC).

7. The system of claim 1, wherein the applicant is a non-human applicant, and wherein the processing of the submission data to generate structured applicant data for the applicant comprises:

based on at least a portion of the submission data, scraping at least one of website data or a third-party data feed for online information regarding the applicant; and using at least one of the natural language processing technique or the artificial intelligence technique to generate an applicant summary based on the online information, wherein the structured applicant data is generated to include information extracted from the applicant summary.

8. The system of claim 1, wherein the applicant is a non-human applicant, and wherein the processing of the submission data to generate structured applicant data for the applicant comprises:

based on at least a portion of the submission data, scraping at least one of website data or a third-party data feed for online information regarding the applicant;

generating an applicant summary based on the online information; and using at least one of the natural language processing technique or the artificial intelligence technique to determine a set of business classifications for the applicant based on the applicant summary, wherein the structured applicant data is generated to include classification information extracted from the set of business classifications.

9. The system of claim 8, wherein the set of business classifications for the applicant is determined based on the applicant summary and a set of standardized codes.

10. The system of claim 9, wherein the set of standardized codes comprises at least one of Standard Industrial Classification (SIC) codes, North American Industry Classification System (NAICS) codes, or Source Classification Codes (SCCs).

11. The system of claim 1, wherein the one or more electronic submissions comprise at least one of an electronic insurance application document or an electronic questionnaire document.

12. The system of claim 1, wherein the artificial intelligence technique comprises using a set of neural network models.

13. The system of claim 12, wherein the set of neural network models comprises a transformer-based language model fine-tuned on domain-specific data.

14. A method comprising:

accessing, by a processor, submission data associated with an application for underwriting an insurance policy for an applicant, the submission data comprising one or more electronic submissions from the applicant;

processing, by the processor, the submission data to generate structured applicant data for the applicant, wherein the processing of the submission data comprises using at least one of a first natural language processing technique or a first artificial intelligence technique to process the submission data, and wherein the structured applicant data comprises applicant information relevant for insurance risk analysis, and wherein at least some portion of the applicant information is extracted from at least one of the one or more electronic submissions;

accessing, by the processor, a risk appetite defining system for risk appetite data for an insurance carrier selected for underwriting the insurance policy, wherein the risk appetite data comprises a structured machine-readable rule set structured to indicate code signals, risk signals, and questions and answers that codify a risk appetite of the insurance carrier for unwriting insurance policies, and wherein the risk appetite defining system generates the structured machine-readable rule set by extracting the structured machine-readable rule ingesting unstructured text from an underwriting manual of the insurance carrier;

using, by the processor, one or more neural network models to analyze the structured applicant data based on the structured machine-readable rule set customized for the insurance carrier's risk appetite data and to generate risk assessment data for the applicant based on the analysis, wherein the one or more neural network models comprise one or more transformer-based language models fine-tuned on insurance data to understand complex language and terminology in underwriting manuals, wherein the using of the one or more neural network models to analyze the structured applicant data comprises:

using at least one neural network model of the one or more neural network models to semantically match at least a portion of the structured applicant data to a set of risk signals indicated in the structured machine-readable rule set;

determining a risk score for the applicant based on the set of risk signals, wherein an individual risk signal of the set of risk signals is associated with a value that either increases or decreases the risk score for the applicant; and determining at least one of a risk classification for the applicant based on the risk score, wherein the risk assessment data comprises:

a summary of detected risk signals based on the set of risk signals;

the risk score for the applicant; and the at least one risk classification for the applicant;

causing, by the processor, at least a portion of the risk assessment data to be displayed in a graphical user interface accessible to a client device, wherein the graphical user interface displays a first section and a second section, wherein the first section displays one or more risk signals from the summary of detected risk signals that each have a confidence above a confidence threshold, wherein the second section displays one or more risk signals from the summary of detected risk signals that each have a confidence below the confidence threshold, and wherein the second section comprises a user feedback interface for the one or more risk signals from the summary of detected risk signals that each have the confidence below the confidence threshold; and receiving, by the processor and via the user feedback interface, user feedback to either apply or disregard at least one risk signal displayed in the second section with respect to the applicant, wherein the user feedback is used to adjust generation of the risk assessment data for the applicant.

15. A non-transitory computer-readable storage medium including instructions that when executed by a processor, cause the processor to perform operations comprising:

accessing submission data associated with an application for underwriting an insurance policy for an applicant, the submission data comprising one or more electronic submissions from the applicant;

processing the submission data to generate structured applicant data for the applicant, wherein the processing of the submission data comprises using at least one of a first natural language processing technique or a first artificial intelligence technique to process the submission data, and wherein the structured applicant data comprises applicant information relevant for insurance risk analysis, and wherein at least some portion of the applicant information is extracted from at least one of the one or more electronic submissions;

accessing a risk appetite defining system for risk appetite data for an insurance carrier selected for underwriting the insurance policy, wherein the risk appetite data comprises a structured machine-readable rule set structured to indicate code signals, risk signals, or questions and answers that codify a risk appetite of the insurance carrier for unwriting insurance policies, and wherein the risk appetite defining system generates the structured machine-readable rule set by extracting the structured machine-readable rule ingesting unstructured text from an underwriting manual of the insurance carrier;

using one or more neural network models to analyze the structured applicant data based on the structured machine-readable rule set customized for the insurance carrier's risk appetite data and to generate risk assessment data for the applicant based on the analysis, wherein the one or more neural network models comprise one or more transformer-based language models fine-tuned on insurance data to understand complex language and terminology in underwriting manuals, wherein the using of the one or more neural network models to analyze the structured applicant data comprises:

using at least one neural network model of the one or more neural network models to semantically match at least a portion of the structured applicant data to a set of risk signals indicated in the structured machine-readable rule set, determining a risk score for the applicant based on the set of risk signals, wherein an individual risk signal of the set of risk signals is associated with a value that either increases or decreases the risk score for the applicant; and determining at least one of a risk classification for the applicant based on the risk score, wherein the risk assessment data comprises:

a summary of detected risk signals based on the set of risk signals;

the risk score for the applicant; and the at least one risk classification for the applicant;

causing at least a portion of the risk assessment data to be displayed in a graphical user interface accessible to a client device, wherein the graphical user interface displays a first section and a second section, wherein the first section displays one or more risk signals from the summary of detected risk signals that each have a confidence above a confidence threshold, wherein the second section displays one or more risk signals from the summary of detected risk signals that each have a confidence below the confidence threshold, and wherein the second section comprises a user feedback interface for the one or more risk signals from the summary of detected risk signals that each have the confidence below the confidence threshold; and receiving, via the user feedback interface, user feedback to either apply or disregard at least one risk signal displayed in the second section with respect to the applicant, wherein the user feedback is used to adjust generation of the risk assessment data for the applicant.

16. The method of claim 14, wherein at least the portion of the structured applicant data comprises one or more electronic questionnaire responses extracted from the submission data during the processing of the submission data.

17. The method of claim 14, wherein the using of the one or more neural network models to analyze the structured applicant data comprises:

using at least one neural network model of the one or more neural network models to generate a risk summary based on at least a portion of the structured applicant data, wherein the at least one neural network model comprises a transformer-based language model fine-tuned on insurance data to understand complex language and terminology in underwriting manuals, and wherein the risk assessment data comprises the risk summary.

18. The method of claim 14, wherein the set of risk signals comprises a set of keyword-based risk signals, and wherein each risk signal of the set of keyword-based risk signals is associated with one or more keywords.

19. The method of claim 14, wherein the applicant is a non-human applicant, wherein the set of risk signals comprises a set of code-based risk signals, and wherein the set of code-based risk signals is generated based on a set of standardized codes for defining and classifying businesses.

20. The method of claim 19, wherein the set of standardized codes comprises at least one of Standard Industrial Classification (SIC) codes, North American Industry Classification System (NAICS) codes, or Source Classification Codes (SCC).

\* \* \* \* \*